(12) United States Patent
Morrison et al.

(10) Patent No.: US 10,902,854 B1
(45) Date of Patent: Jan. 26, 2021

(54) SYSTEMS AND METHODS FOR GENERATING RESPONSES TO QUESTIONS ABOUT USER ACCOUNTS

(71) Applicant: Eyeballs Financial, LLC, Newport Beach, CA (US)

(72) Inventors: Mitchell Steven Morrison, Newport Beach, CA (US); Brian Francis Fitzgerald, Corona, CA (US); Rebecca Ann Morrison, Canyon Lake, CA (US)

(73) Assignee: Eyeballs Financial, LLC, Newport Beach, CA (US)

( * ) Notice: Subject to any disclaimer, the term of this patent is extended or adjusted under 35 U.S.C. 154(b) by 0 days.

(21) Appl. No.: 16/875,659

(22) Filed: May 15, 2020

Related U.S. Application Data

(60) Provisional application No. 62/849,702, filed on May 17, 2019.

(51) Int. Cl.
*G10L 15/22* (2006.01)
*G06F 16/332* (2019.01)
*G06Q 10/10* (2012.01)
*G06Q 10/06* (2012.01)
*G10L 15/18* (2013.01)
*G06F 3/0482* (2013.01)
(Continued)

(52) U.S. Cl.
CPC ............ *G10L 15/22* (2013.01); *G06F 3/0482* (2013.01); *G06F 3/04883* (2013.01); *G06F 3/167* (2013.01); *G06F 16/3329* (2019.01); *G06Q 10/06311* (2013.01); *G06Q 10/107* (2013.01); *G06Q 10/1095* (2013.01); *G10L 15/1815* (2013.01); *G06Q 30/016* (2013.01); *G10L 2015/221* (2013.01)

(58) Field of Classification Search
None
See application file for complete search history.

(56) References Cited

U.S. PATENT DOCUMENTS 5,759,101 A * 6/1998 Von Kohorn ........... A63F 13/12
463/40
5,819,263 A 10/1998 Bromley et al.
(Continued)

FOREIGN PATENT DOCUMENTS

| CN | 102542507 | 7/2012 |
|---|---|---|
| KR | 100305177 | 11/2001 |
| WO | WO 2018/098581 | 6/2018 |

OTHER PUBLICATIONS

"Do You Have the Best Technology for Your Services?", http://www.sourcemediaconferences.com/CPA09/pdf/Vitauskas.pdf, Financial Planning Summit for Accountants, 33 pages.
(Continued)

*Primary Examiner* — Neeraj Sharma
(74) *Attorney, Agent, or Firm* — Knobbe, Martens, Olson & Bear LLP

(57) ABSTRACT

Some embodiments provide systems and methods that can alleviate the burdens on professional advisors of preparing snapshots and answering client questions, particularly questions that do not require professional judgment or strategy. Such embodiments can automate creation of snapshots of account data collected from multiple institutions, suggest questions that are relevant to a user's accounts, and provide programmatic responses to factual or definitional questions pertaining to those accounts.

16 Claims, 13 Drawing Sheets

(51) Int. Cl.
*G06F 3/0488* (2013.01)
*G06F 3/16* (2006.01)
*G06Q 30/00* (2012.01)

(56) References Cited

U.S. PATENT DOCUMENTS

| | | | |
|---|---|---|---|
| 6,144,938 A * | 11/2000 | Surace | G10L 13/033 |
| | | | 704/257 |
| 6,430,542 B1 | 8/2002 | Moran | |
| 6,473,745 B2 | 10/2002 | Doerr et al. | |
| 6,757,362 B1 * | 6/2004 | Cooper | H04M 3/527 |
| | | | 379/88.01 |
| 7,130,800 B1 * | 10/2006 | Currey | G06F 21/32 |
| | | | 704/273 |
| 7,171,384 B1 | 1/2007 | Fitzpatrick et al. | |
| 7,216,099 B2 | 5/2007 | Chen et al. | |
| 7,310,615 B2 | 12/2007 | Lewis | |
| 7,475,032 B1 | 1/2009 | Patnode et al. | |
| 7,698,190 B2 | 4/2010 | Penkalski et al. | |
| 7,711,672 B2 * | 5/2010 | Au | G06F 40/20 |
| | | | 706/55 |
| 7,801,787 B2 | 9/2010 | Jain et al. | |
| 7,962,517 B2 | 6/2011 | Tritt et al. | |
| 8,078,524 B2 | 12/2011 | Crawford et al. | |
| 8,112,332 B1 | 2/2012 | Garcia | |
| 8,433,632 B2 | 4/2013 | Sankaran et al. | |
| 8,498,913 B2 | 7/2013 | Jenson et al. | |
| 8,620,785 B1 | 12/2013 | Wilks et al. | |
| 8,635,101 B2 | 1/2014 | Wright | |
| 8,892,419 B2 | 11/2014 | Lundberg et al. | |
| 9,524,524 B2 | 12/2016 | Calman et al. | |
| 9,747,175 B2 | 8/2017 | Mohammad et al. | |
| 9,852,646 B2 | 12/2017 | Kozloski et al. | |
| 10,019,713 B1 * | 7/2018 | McIntosh | G06Q 20/409 |
| 10,353,935 B2 * | 7/2019 | Wegryn | G06F 16/90344 |
| 10,446,141 B2 * | 10/2019 | Krishnamoorthy | G10L 15/02 |
| 10,650,818 B2 * | 5/2020 | Elliott | G10L 15/22 |
| 2002/0019791 A1 | 2/2002 | Goss et al. | |
| 2003/0110106 A1 | 6/2003 | Deshpande et al. | |
| 2004/0078307 A1 | 4/2004 | Carver | |
| 2004/0143534 A1 | 7/2004 | Musselwhite, III | |
| 2005/0033582 A1 * | 2/2005 | Gadd | G06Q 30/02 |
| | | | 704/277 |
| 2006/0074788 A1 | 4/2006 | Grizack et al. | |
| 2006/0241989 A1 | 10/2006 | Walters et al. | |
| 2008/0253363 A1 * | 10/2008 | Altberg | G09B 5/125 |
| | | | 370/352 |
| 2010/0100470 A1 | 4/2010 | Buchanan et al. | |
| 2010/0205112 A1 | 8/2010 | Reynolds | |
| 2012/0233207 A1 * | 9/2012 | Mohajer | G10L 15/183 |
| | | | 707/769 |
| 2013/0036073 A1 | 2/2013 | Kiger | |
| 2013/0282757 A1 * | 10/2013 | Ehsani | G06F 16/168 |
| | | | 707/770 |
| 2013/0304758 A1 * | 11/2013 | Gruber | G06F 16/248 |
| | | | 707/769 |
| 2014/0101139 A1 | 4/2014 | Gemert et al. | |
| 2014/0108268 A1 | 4/2014 | Miller et al. | |
| 2014/0136381 A1 | 5/2014 | Joseph et al. | |
| 2014/0188758 A1 | 7/2014 | Harper et al. | |
| 2014/0289166 A1 | 9/2014 | Wyrough | |
| 2014/0358905 A1 | 12/2014 | Stevens | |
| 2017/0200220 A1 | 7/2017 | Nicholson et al. | |
| 2017/0278181 A1 | 9/2017 | Shah | |
| 2018/0108092 A1 | 4/2018 | Goodyear et al. | |
| 2018/0285836 A1 * | 10/2018 | Enobakhare | G06Q 20/0425 |
| 2019/0236134 A1 * | 8/2019 | Galitsky | G06F 16/35 |
| 2020/0110823 A1 * | 4/2020 | Steuer | G06F 16/3347 |

OTHER PUBLICATIONS

"Get Started Using Einstein Analytics: Learn What You can Do with Einstein Analytics", https://help.salesforce.com/articleView?id=bi_use_wave_everywhere.htm&type=5, Salesforce, 10 pages.

"Moneyware Financial Planning Solution", https://www.milessoft.com/financial-planning-software/, Miles Software, 3 pages.

"Mapping Fintech to The Financial Planning Process", https://fpa.com/au/fintech/, Financial Planning Association of Australia Limited, 17 pages.

"Real-Time Risk Innovation", https://www.imaginesoftware.com/, Imagine Software, 5 pages.

"The Fastest Easiest Way to Automate Business Insights.", https://datahero.com/, DataHero, 4 pages.

"Transaction Tracking", https://www.nastel.com/transaction-tracking/, Nastel, 5 pages.

"You Already Have Investment Accounts, We Help Make Them Smarter", https://www.futureadvisor.com/, Future Advisor, 1 page.

"Unified Business Analytics. Consistent Data. Better Decisions", https://www.longview.com/analytics#highlights, LongView, 5 pages.

Charles Schwab announces new portfolio integration with Google, The Daily Brief, Schwab Enables Google Voice Tech for Some Account Inquiries, www.wealthmanagment.com/technology/schwab-enables-google-voice-tech-some-account-inquiries, Jul. 8, 2020.

* cited by examiner

SYSTEMS AND METHODS FOR GENERATING RESPONSES TO QUESTIONS ABOUT USER ACCOUNTS

INCORPORATION BY REFERENCE TO ANY PRIORITY APPLICATIONS

Any and all applications for which a foreign or domestic priority claim is identified in the Application Data Sheet as filed with the present application, including U.S. Application No. 62/849,702, filed on May 17, 2019, is hereby incorporated by reference in its entirety under 37 CFR 1.57.

TECHNICAL FIELD

This disclosure is related to user interface technology and to electronic systems and methods for generating responses to questions based on current and/or historical data collection.

BACKGROUND

Managing investment accounts held at different institutions is complex and daunting for many individuals. With many hundreds, often thousands of products available in a market and a bewildering array of electronic or paper statements, the complexity for a typical investor is increased. As a result, providing a snapshot of up-to-date financial information that is tailored to an individual's specific accounts requires significant manual effort from individuals or financial advisors. Preparing such snapshots and answering client questions can consume a significant amount of time for professional advisors.

SUMMARY

Some embodiments disclosed herein provide systems and methods that can alleviate the burdens on professional advisors of preparing snapshots and answering client questions, particularly questions that do not require professional judgment or strategy. Such embodiments can automate creation of current and/or historical snapshots of account data collected from institutions(s), suggest questions that are relevant to a user's account(s), and provide programmatic responses to factual or definitional questions pertaining to those accounts, which can enable professional advisors to more efficiently help clients.

In some embodiments, an electronic advisor assistant system is disclosed that can identify and respond to context-specific requests received from a user. The system can include a display interface that can output visual information to an electronic display device. The system can include an audio interface that can output electronically-generated sounds to a loudspeaker. The system can include an electronic user input interface that can receive requests from the user via a touchscreen, a microphone, a pointing device, a camera, or a keyboard. The system can include an advisor interface that can generate a display of requests received via the electronic user input interface and added to an advisor response queue. The system can include a transaction data interface that can receive transaction data received from a plurality of custodians of transaction data. The system can include a memory device that can have a library of answerable requests, a compilation of contextual terminology comprising words that identify expressions relevant to an indicated field of the electronic advisor assistant system, and instructions executable by an electronic processor. The instructions, when executed by the electronic processor, can cause the system to receive, via the electronic user input interface, a request. The instructions, when executed by the electronic processor, can cause the system to determine, by the electronic processor, whether the request is in the indicated field by identifying words in the request that match the contextual terminology in the compilation. The instructions, when executed by the electronic processor, can cause the system to determine, by comparing one or more words in the request with the library of answerable requests, whether the request is associated with the library of answerable requests. When it is determined that the request is in the indicated field and is not associated with the library of answerable requests, the system can generate a first response comprising adding the request to the advisor response queue. When it is determined that the request is in the indicated field and is associated with the library of answerable requests, the system can programmatically generate a second response comprising information derived from the transaction data. When it is determined that the request is not in the indicated field, the system can generate a third response which can include an indication that the request cannot be answered by the electronic advisor assistant system. The instructions, when executed by the electronic processor, can cause the system to generate an output to at least one of the display interface or the audio interface indicative of the first response, the second response, or the third response.

In some embodiments, determining whether the request is associated with the library of answerable requests can include determining whether the request includes words calling for an opinion. The request may not be associated with the library of answerable requests when the request comprises words calling for an opinion.

In some embodiments, generating the first response can include an indication that the request is for an advisor with access to the advisor response queue.

In some embodiments, generating the third response can include sending the request to a technician to build a hint library. The hint library can associates one or more words from the request with one or more words in the contextual terminology in the compilation.

In some embodiments, generating the third response can include an automated system analyzing the request to build a hint library. The automated system can automatically associate one or more words from the request with the contextual terminology in the compilation.

In some embodiments, the system can include a natural-language interpretation engine that is configured to interpret the request received via the microphone.

In some embodiments, the display interface can display the library of answerable requests.

In some embodiments, the instructions, when executed by the electronic processor, can cause the system to determine that the user selected one of the answerable requests to submit as a request.

In some embodiments, the instructions, when executed by the electronic processor, can cause the system to determine that the user touched the touchscreen to indicate that one of the answerable requests is a favorite answerable request. In response to determining that the user touched the touchscreen to indicate that one of the answerable requests is a favorite answerable request, the system can add the indicated favorite answerable request to a collection of one or more favorite answerable requests.

In some embodiments, the instructions, when executed by the electronic processor, can cause the system to determine that the user requested a response for all favorite answerable requests in the collection of favorite answerable requests. In response to determining that the user requested the response for all favorite answerable requests in the collection of favorite answerable request, the system can programmatically generate the second response comprising information derived from the transaction data for each favorite answerable request in the collection of favorite answerable requests.

In some embodiments, the instructions, when executed by the electronic processor, can cause the system to generate the compilation of contextual terminology based on transaction data received from the plurality of custodians of transaction data.

In some embodiments, the instructions, when executed by the electronic processor, can cause the system to generate the library of answerable requests based on transaction data received from the plurality of custodians of transaction data.

In some embodiments, generating the first response can include programmatically prepopulating an email response to the user based on the request.

In some embodiments, the instructions, when executed by the electronic processor, can cause the system to determine that the user requested an appointment with the advisor. In response to determining that the user requested an appointment with the advisor, the system can add the appointment request to the advisor response queue.

In some embodiments, an electronic advisor assistant system is disclosed that can identify and respond to context-specific requests received from a user. The system can include a display interface that can output visual information to an electronic display device. The system can include an audio interface that can output electronically-generated sounds to a loudspeaker. The system can include an electronic user input interface that can receive request from the user via a touchscreen, a microphone, a pointing device, a camera, or a keyboard. The system can include an advisor interface can generate a display of requests received via the electronic user input interface and added to an advisor response queue. The system can include a transaction data interface that can receive transaction data received from a plurality of custodians of transaction data. The system can include a memory device that can include a library of answerable requests and instructions executable by an electronic processor. The instructions, when executed by the electronic processor, can cause the system to receive, via the electronic user input interface, a request. The instructions, when executed by the electronic processor, can cause the system to determine, by comparing one or more words in the request with the library of answerable requests and identifying one or more words in the request calling for an opinion, whether the request is associated with the library of answerable requests. When it is determined that the request is not associated with the library of answerable requests based on the identification of one or more words in the request calling for an opinion, the system can generate a first response comprising adding the request to the advisor response queue. When it is determined that the request is not associated with the library of answerable requests based on comparing words in the request with the library of answerable request and one or more words in the request calling for an opinion are not identified, the system can generate a third response indicating that the request cannot be answered. When it is determined that the request is associated with the library of answerable requests, the system can programmatically generate a second response comprising information derived from the transaction data. The instructions, when executed by the electronic processor, can cause the system to generate an output to at least one of the display interface or the audio interface indicative of the first response, second response, or third response.

In some embodiments, generating the first response can include an indication that the request is for an advisor with access to the advisor response queue.

In some embodiments, generating the first response can include programmatically prepopulating an email response to the user based on the request.

In some embodiments, generating the third response can include sending the request to a technician device to build a hint library. The hint library can associate one or more words from the request with one or more words in at least one of the answerable requests in the library of answerable requests.

In some embodiments, the instructions, when executed by the electronic processor can cause the system to generate the library of answerable requests based on transaction data received from the plurality of custodians of transaction data.

In some embodiments, the system can include a natural-language interpretation engine that can interpret the request received via the microphone.

BRIEF DESCRIPTION OF THE DRAWINGS

Various embodiments are depicted in the accompanying drawings for illustrative purposes and may not be drawn to scale, and should in no way be interpreted as limiting the scope of the embodiments. In addition, various features of different disclosed embodiments can be combined to form additional embodiments, which are part of this disclosure.

DETAILED DESCRIPTION OF EMBODIMENTS

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

This disclosure presents various embodiments of systems and methods related to providing responses to questions regarding user accounts. Such embodiments can automate creation of current and/or historical snapshots of account data collected from institutions(s), suggest questions that are relevant to a user's accounts, and provide programmatic responses to factual or definitional questions pertaining to those accounts, which can enable professional advisors to more efficiently help clients.

Figure 1:
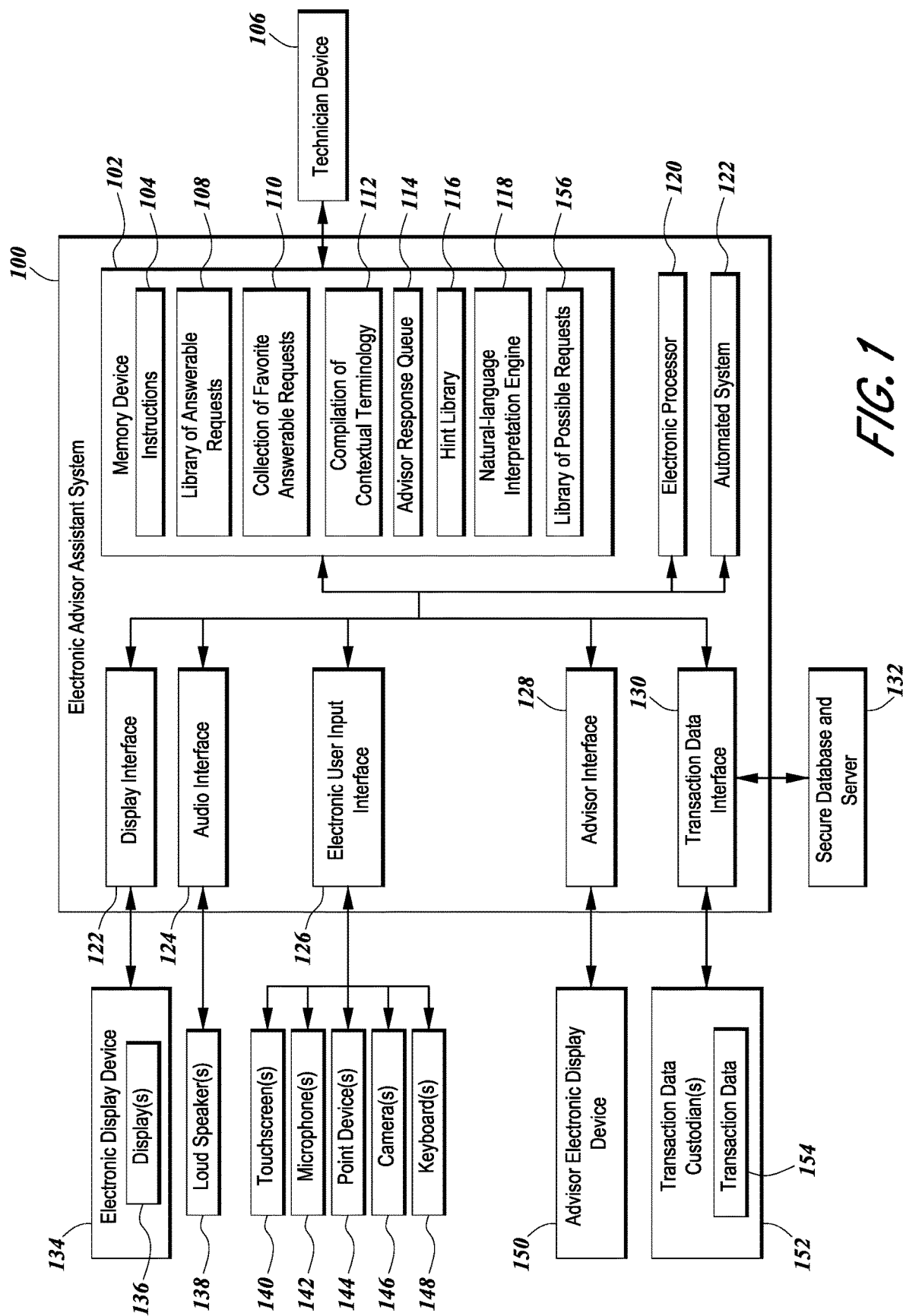
FIG. 1 illustrates an example system diagram.

FIG. 1 schematically illustrates an example system diagram of an electronic advisor assistant system 100, according to some embodiments. The architecture of the electronic advisor assistant system 100 can include an arrangement of computer hardware and software components used to implement aspects of the present disclosure. The electronic advisor assistant system 100 may include more or fewer elements than those shown in FIG. 1. It is not necessary, however, that all of these elements be shown in order to provide an enabling disclosure.

As illustrated, the electronic advisor assistant system 100 can include an electronic processor 120, memory device 102, display interface 122, audio interface 124, electronic user input interface 126, advisor interface 128, and/or transaction data interface 130, all of which can communicate with one another by way of a data communication technique. The electronic processor 120 can read and write to the memory device 102 and can execute computer program instructions 104 stored on the memory device 102 to perform the methods disclosed herein.

The display interface 122 can interface with one or more electronic display device(s) 134, which can include one or more display(s) 136. In some embodiments, the display(s) 136 can be touchscreen(s). The electronic display device 134 can be a computer (e.g., personal computer, laptop, etc.), portable electronic device, smart phone, tablet, or another device capable of displaying visual data. The display interface 122 can receive input from the electronic display device 134. The display interface 122 and electronic display device 134 can be controlled by the electronic processor 120 executing the instructions 104 stored on the memory device 102. For example, the electronic processor 120 can execute instructions 104 to control the electronic display device 134, via the display interface 122, to display a graphical user interface (GUI) as shown in FIGS. 8-13. The electronic display device 134 can display a library of answerable requests 108, collection of favorite requests 110, answers to user requests, and/or other visual data (e.g., text data), as described elsewhere herein.

The audio interface 124 can output audio via one or more loud speaker(s) 138. The audio interface 124 and loud speaker(s) 138 can be controlled by the electronic processor 120 executing the instructions 104 stored on the memory device 102. For example, the electronic processor 120 can execute instructions 104 to control the loud speaker(s) 138 to emit audio data (e.g., audio voice data) which can include audible answers to users' requests.

The electronic user input interface 126 can interface with one or more devices to receive user input, which can include one or more of touchscreen(s) 140, microphone(s) 142, point device(s) 144, camera(s) 146, and/or keyboard(s) 148. The touchscreen(s) 140, microphone(s) 142, point device(s) 144, camera(s) 146, and/or keyboard(s) 148 can be incorporated into the electronic display device 134. In some embodiments, the user can speak into the microphone(s) 142 to submit a request (e.g., request information from the system 100, submit commands to the system 100, etc.). In some embodiments, the user can touch the touchscreen(s) 140 to submit a request. In some embodiments, the user can manipulate the point device(s) 144 (e.g., mouse, stylus, touchpad, or other suitable device) to submit a request. In some embodiments, the user can perform gestures that can be detected by the camera(s) 146 to submit a request. In some embodiments, the user can manipulate keys on the keyboard(s) 148 to submit a request.

The advisor interface 128 can interface with one or more advisor electronic display device(s) 150. The advisor electronic display device(s) 150 can be a computer (e.g., personal computer, laptop, etc.), portable electronic device, smart phone, tablet, or another device capable of displaying electronic data. The advisor interface 128 can, in some embodiments, receive input from the advisor electronic display device(s) 150. The advisor interface 128 and advisor electronic display device(s) 150 can be controlled by the electronic processor 120 executing the instructions 104 stored on the memory device 102. For example, the electronic processor 120 can execute instructions 104 to control the advisor electronic display device(s) 150, via the advisor interface 128, to display visual data, which can include visual data relating to the advisor response queue 114, prepopulated emails, and/or other visual data described herein. The advisor electronic display device(s) 150 can be operated by an advisor (e.g., expert, financial expert, financial advisor) that is associated with the user.

The transaction data interface 130 can interface with one or more transaction data custodian(s) 152, which can include financial database(s) and/or server(s) of financial institutions. The transaction data custodian(s) 152 can include transaction data 154 provided by the financial institution from the financial portfolio account statement(s) of the user. The transaction data 154 can include the financial account statement information of the user, which can include current and/or historical financial information of the user. The current and/or historical financial information of the user can include financial information on a daily, weekly, monthly, quarterly, yearly, all time, and/or other time-period basis. The current and/or historical financial information can relate to any asset(s), which can include financial instruments, investments, margin account, money market, CDs, Trusts and/or savings held within the individual user's financial portfolio account(s). The current and/or historical financial information can include asset totals, transactions, balances, gains, losses, percentage of gain, and/or percentage of loss, which can be at the time the current financial information is accessed and/or over a period of time. Transaction data 154 can, throughout the entirety of this disclosure, refer to at least the foregoing information.

The electronic processor 120 can execute the instructions 104 stored on the memory device 102 to access and/or receive the transaction data 154 of the user from the transaction data custodians 152 via the transaction data interface 130. For example, the instructions 104 can include an application program interface (e.g., API, custom API) which can be coded to be compatible to a pre-programmed technological financial database platform provided by the user's financial institution to generate financial portfolio account statements. Each of the various financial institutions can have specific programmed code for their individual financial databases and servers. Accordingly, the API can be customized to the specifications, code, and platform of individual financial institutions to facilitate communication between the system 100 and individual financial databases and servers.

The transaction data interface 130 and/or another element of the system 100 can interface with a secure database and server 132. In some embodiments, the instructions 104, which can include the API described above, can facilitate pushing the transaction data 154 of the user, which can include current and/or historical financial data from the user's financial account portfolio statement(s), from the individual financial database(s) and server(s) of the transaction data custodian(s) 152 to a secure database and server 132. The secure database and server 132 can be a secure separate matching financial database and server related to the API. In some embodiments, the system 100 can process and/or search transaction data 154 of the user stored in the secure database and server 132 when responding to a request, generating the library of answerable requests 108, and/or for other purposes. In some embodiments, the system 100 can push and/or provide transaction data 154 of the user to the electronic display device 134 of the user. In response to a request, the instructions 104 can command the electronic display device 134 to display visual data (e.g., text data) indicative of requested transaction data 154. In response to a request, the instructions 104 can command the loud speaker(s) 138 to emit audio data (e.g., audio voice data) indicative of the requested transaction data 154. In some embodiments, the instructions 104 can input the requested transaction data 154 on the electronic display device 134 and/or other device of the user.

The memory device 102, as described elsewhere herein, can include computer program instructions 104 that the electronic processor 120 can execute in order to implement one or more methods described herein. The program instructions 104 can include an API as described elsewhere herein. The memory device 102 can generally include RAM, ROM, and/or other persistent, auxiliary or non-transitory computer-readable media. The memory device 102 can store an operating system that provides computer readable instructions for use by the electronic processor 102 in the general administration and operation of the electronic advisor assistant system 100.

The memory device 102 can include a natural-language interpretation engine 118. The natural-language interpretation engine 118 can interpret audio data received by the microphone(s) 142. The natural-language interpretation engine 118 can convert the audio data received by the microphone(s) 142 into text, which can be interpreted and/or processed by the system 100. In some embodiments, the natural-language interpretation engine 118 can be the Flutter speech-to-text application by Google or a similar engine. With a request in text form, the electronic processor 120 can execute instructions 104 stored on the memory device 102 to deconstruct and analyze the request of the user. For example, the electronic processor 120 can execute instructions 104 stored on the memory device 102 to identify words in the request of the user, which can at least include identifying a subject word, qualifier word, and/or opinion word in the request to determine an appropriate response as described elsewhere herein. As described elsewhere herein, the system 100 can use the compilation of contextual terminology 112 to identify subject word(s), qualifier word(s), and/or opinion word(s).

The memory device 102 can include a compilation of contextual terminology 112. The compilation of contextual terminology 112 can include one or more words that identify expressions relevant to an indicated field of the electronic advisor assistant system 100. In some embodiments, the compilation of contextual terminology 112 can include words that identify expressions relevant to the financial field, which can include words related to the transaction data 154 as described elsewhere herein (e.g., words indicating a time period; words related to any asset(s) such as financial instruments, investments, margin account, money market, CDs, Trusts and/or savings; and/or other words such as asset totals, transactions, balances, gains, losses, percentage of gain, percentage of loss, and/or other words). For example, the compilation of contextual terminology 112 can include one or more subject words indicative of a subject such as "assets," "money market," etc. The compilation of contextual terminology 112 can include one or more qualifier words that can be associated with one or more subject words such as "today," "year," "total," "balance," and/or other words. In some embodiments, the compilation of contextual terminology 112 can be created by an administrator of the system 100, words derived from the transaction data 154 of the user, words from the library of possible requests 156, words from the advisor, and/or other sources. In some embodiments, the system 100 can identify and compile words that are in the financial portfolio account statement(s) of the transaction data 154 to create the compilation of contextual terminology 112.

In some embodiments, the system 100 can use the compilation of contextual terminology 112 to identify irrelevant requests (e.g., requests not related to the indicated field). The electronic processor 120 can execute instructions 104 stored on the memory device 102 to compare word(s) in the user's request with words in the compilation of contextual terminology 112 to determine if the user's request is in the indicated field (e.g., the relevance of the user's request). If there is a match between one or more words in the user's request and one or more words in the compilation of contextual terminology 112, the system 100 can determine that the user's request is in the indicated field. If there is not a match between one or more words in the user's request and one or more words in the compilation of contextual terminology 112, the system 100 can determine that the user's request is not in the indicated field. For example, the user may ask the system 100, "Is it going to rain today?" For the financial field, the system 100 can compare one or more words in the user's request against one or more words in the compilation of contextual terminology 112 to determine that the user's request is not in the financial field. The comparison of words in the request against the compilation of contextual terminology 112 can be useful in filtering out questions that cannot be answered by the system 100 and/or should not be added to an advisor response queue 114. In some embodiments, the system 100 can use the compilation of contextual terminology 112 to analyze or process a request from the user. For example, the system 100 can receive a request from the user and search within the request for one or more words from the compilation of contextual terminology 112 and, upon identifying one or more matched words between the request and the compilation of contextual terminology 112, use the matched words to identify if the request is associated with the library of answerable requests 108, as described elsewhere herein.

The memory device 102 can include a library of possible requests 156. The library of possible requests 156 can be created by an administrator of the system 100 and/or advisor based on information that is typically provided in transaction data 154 and/or financial portfolio account statements. The library of possible requests 156 can include all questions that the system 100 could potentially answer, which could be any number of questions or variations of questions. The library of possible requests 156 may include one or more questions that are not answerable by the system 100 for a specific user because the user does not have transaction data 154 related to the one or more possible requests. Accordingly, a library of answerable requests 108, described in more detail elsewhere herein, can be identified by the system 100 from the library of possible requests 156 based on the transaction data 154 of the user. For example, if the user has transaction data 154 associated with a question in the library of possible requests 156, then the system 100 can add the question to the library of answerable requests 108. In some embodiments, the library of possible requests 156 is automatically created by the system 100 based on received transaction data 154 of one or more users.

Figure 9:
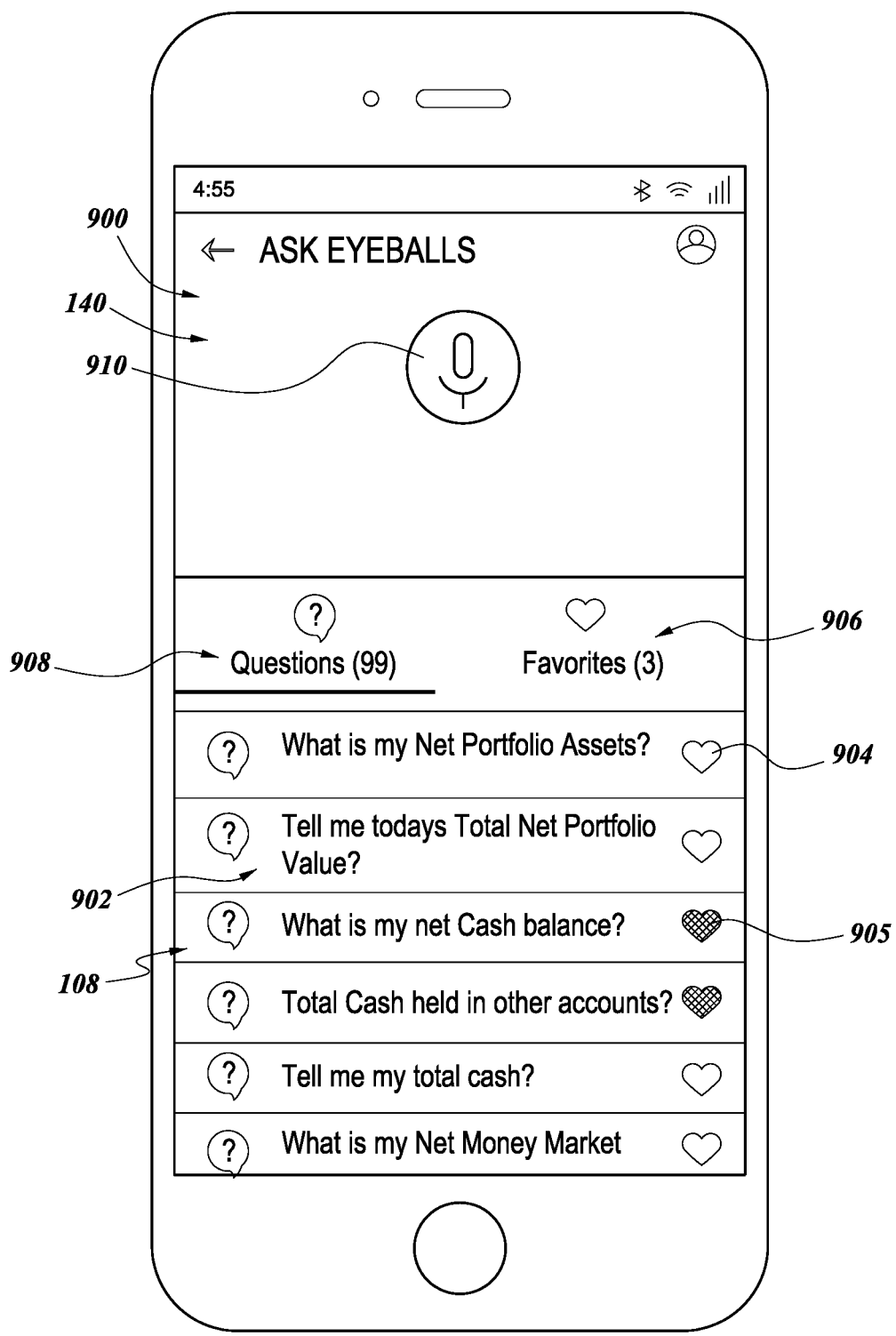
Figure 10:
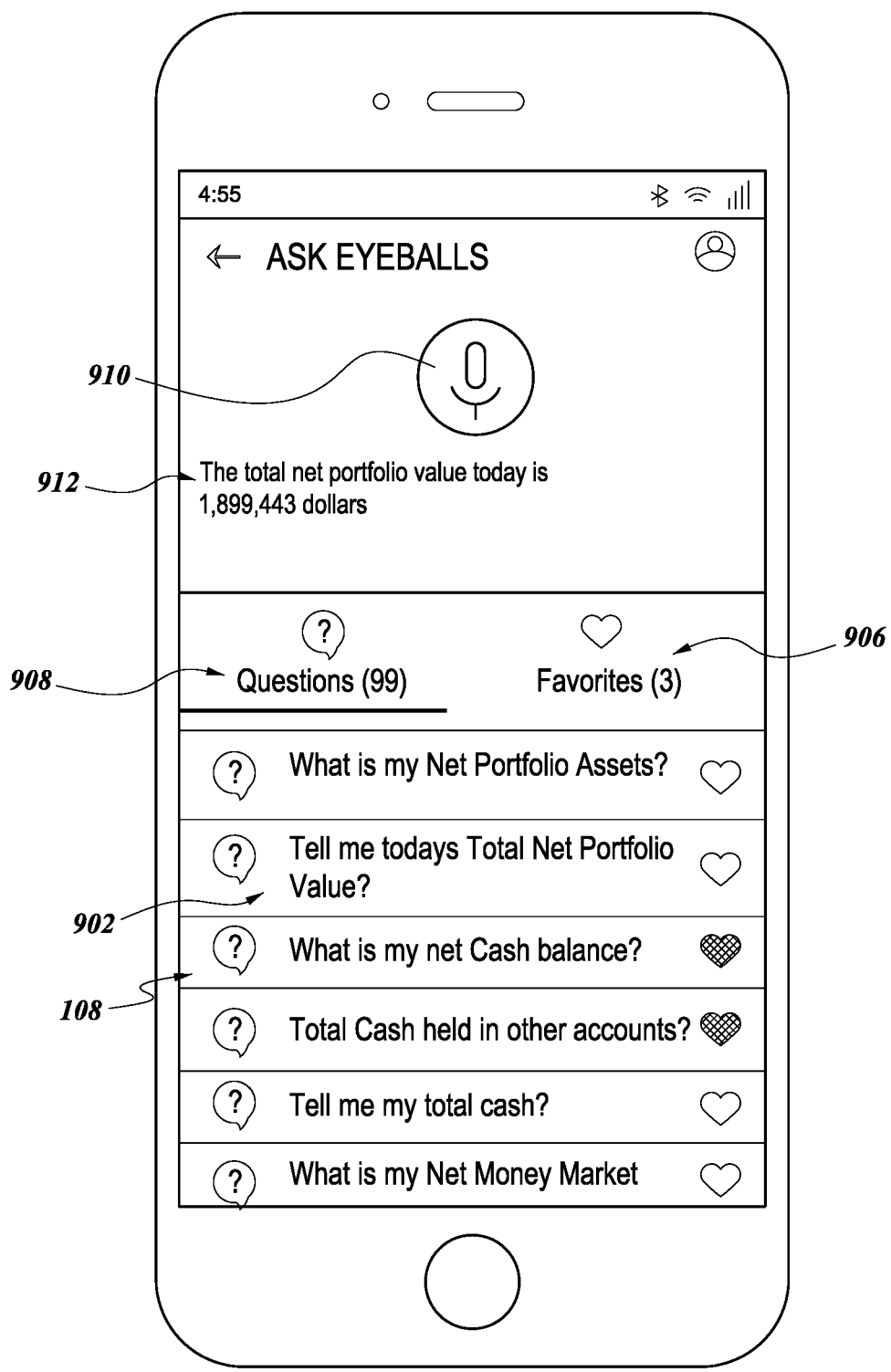
Figure 11:
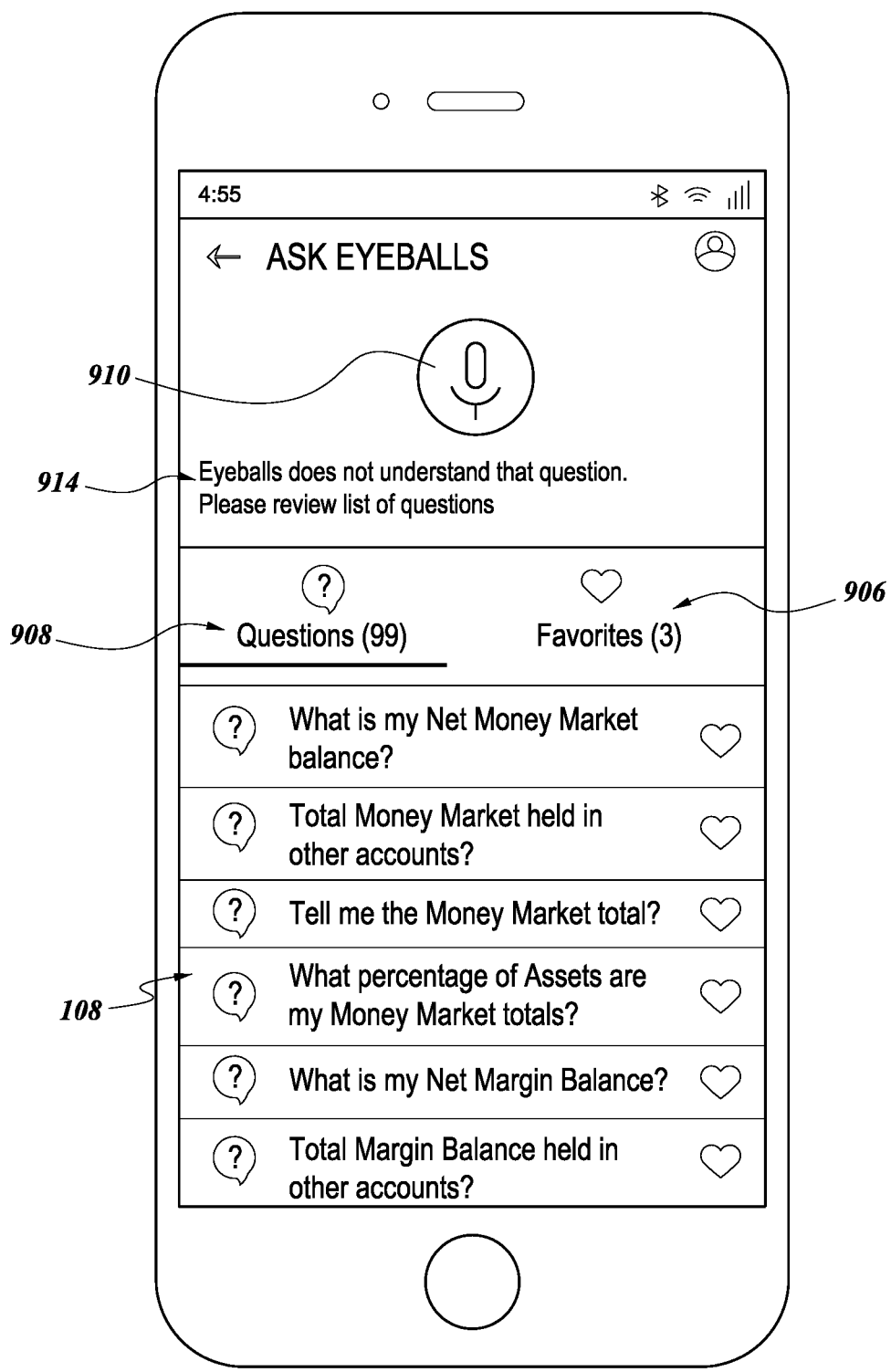
Figure 12:
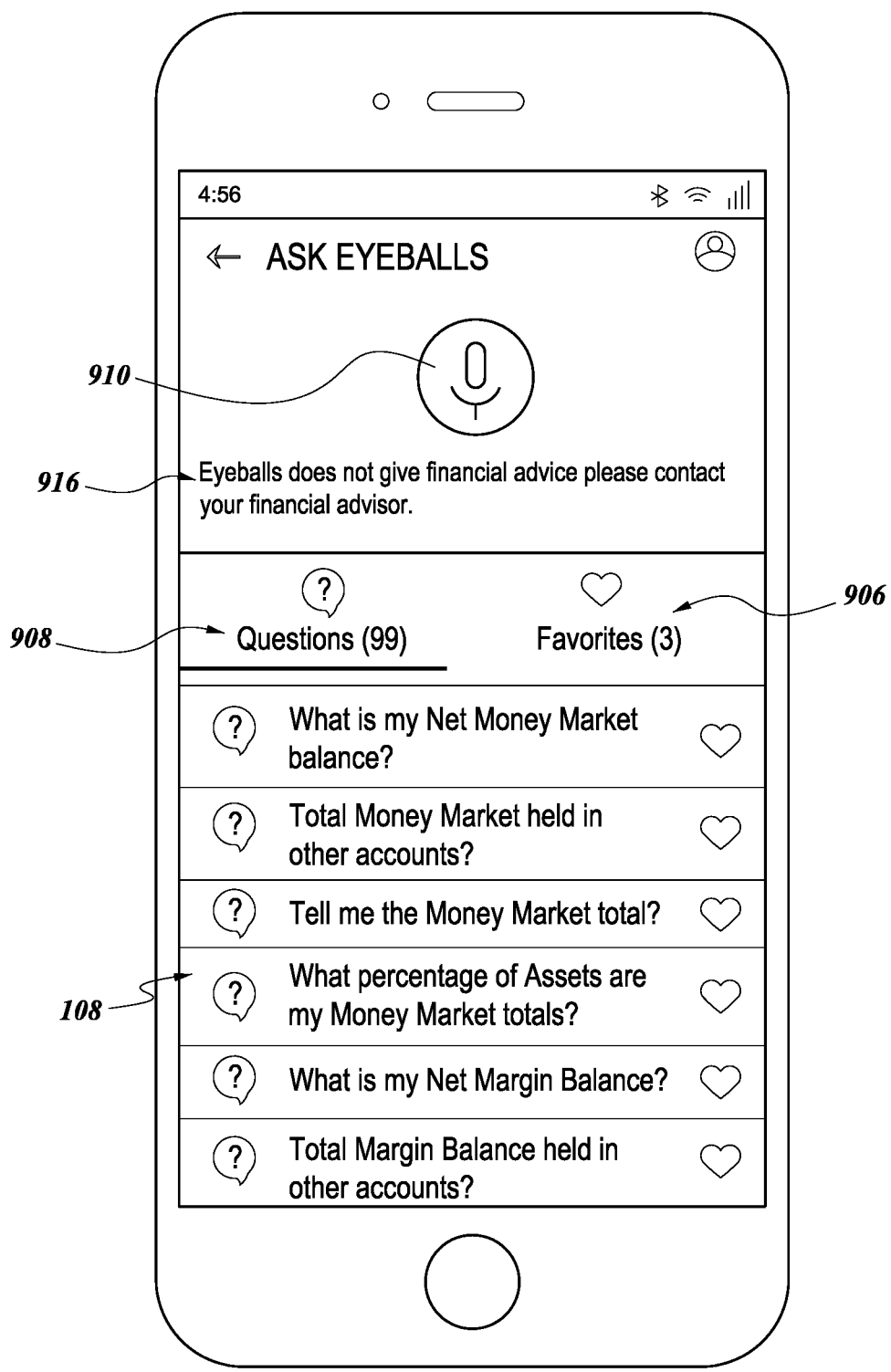

The memory device 102 can include a library of answerable requests 108. The library of answerable requests 108 can include requests that the system 100 can answer based on the transaction data 154 of the user. As described elsewhere herein, the transaction data 154 of the user can include the financial portfolio account statement data provided by the financial institution of the user. The financial portfolio account statement provided by the financial institution can include numerous recorded data streams of asset-related financial information. To generate the library of answerable request 108, the system can search transaction data 154 of the user (e.g., financial portfolio account statement(s)) to identify recorded data streams of asset-related financial information in the user's financial portfolio account statement. For example, the system 100 may search the transaction data 154 of the user and identify a recorded data stream, such as a recorded data stream identified as "Total Net Portfolio Value" (e.g., subject words) with the qualifier "today" and related asset information "$1,899,443.00." As explained above, the system 100 can search the library of possible requests 156 to search for matching words (e.g., matching subject word(s) and qualifier word(s)) between the transaction data 154 and the possible requests in the library of possible request 156. The association or match can be based upon a combination and/or order of words. For example, a specific order of one or more words may associate (match) with one possible request while another specific order of the same one or more words or the addition of another word may associate (match) with another possible request. Upon associating/matching with a possible request in the library of possible requests 156, the system 100 can add the associated/matched possible request to the library of answerable requests 108. Accordingly, the system 100 can add the identified possible requests from the library of possible requests 156, such as "What is today's Total Net Portfolio Value?" or "Tell me today's Total Net Portfolio Value?", to the library of answerable requests 108. Accordingly, the library of answerable requests 108 can be different from user to user because the library of answerable requests 108 is derived from the transaction data 154 for the specific user. The system 100 can save the library of answerable requests 108 to the memory device 102, secure database and server 132, and/or the user's electronic display device 134. The system 100 can display the library of answerable requests 108 via the electronic display device 134, as shown in FIG. 9. There can be any number of answerable requests in the library of answerable requests 108 depending on the user's transaction data 154.

The library of answerable requests 108 can facilitate identifying (e.g., filtering) requests that the system 100 can answer. For example, the electronic processor 120 can execute instructions 104 stored on the memory device 102 to compare one or more words in the request with one or more words in the library of answerable requests 108 to determine if the request is associated with the library of answerable requests 108. In some embodiments, the system 100 searches the library of answerable requests 108 for a subject word and/or qualifier word that matches a subject word and/or qualifier word in the submitted request. As explained above, the system 100 can identify word(s) in the request to search the library of answerable requests 108 based on words in the request that match or associate with one or more words in the compilation of contextual terminology 112. For example, the request may be "What is my Net Money Market Balance today?" The system 100 can search the request for one or more words in the compilation of contextual terminology 112 and determine a match/association with the words "Net Money Market Balance today." The system 100 can then search the library of answerable requests 108 for an answerable request with words "Net Money Market Balance today." The association or match can be based upon a combination and/or order of words. For example, a specific order of one or more words may associate (match) with one answerable request while another specific order of the same one or more words or addition of another word may associate (match) with another answerable request. If a match is identified, the system 100 can determine that the request is associated with an answerable request in the library of answerable requests 108, which can indicate that the user is inquiring about a recorded data stream in the user's financial portfolio account statement. The system 100 can answer the user's request with the asset information related to the associated answerable request in the library of answerable requests 108. Stated differently, the electronic processor 120 can execute instructions 104 stored on the memory device 102 to identify a subject word and/or qualifier word in the request that matches a corresponding value in the user's transaction data 154 to answer a request.

For example, the user may submit a request such as "What is my Total Net Portfolio Value?" to the system 100 with one of the mechanisms described herein. The system 100 can interpret the spoken request with the natural-language interpretation engine 118, converting the audio request into text. The system 100 can analyze the request, which can include deconstructing the request and identifying a subject word and/or qualifier word—such as "Total Net Portfolio Value" that matches/associates with the compilation of contextual terminology 112. The system 100 can search the library of answerable requests 108 for a matching subject word and/or qualifier, such as "Total Net Portfolio Value." A match can indicate that the user's requests is associated with an answerable request in the library of answerable requests 108 (i.e., the user's request is associated with a recorded data stream in the user's transaction data 154). The system 100 can identify the related asset information that is associated with the associated answerable request in the library of answerable requests 108. For example, the system 100 may identify a value of $1,899,443 (related asset information) associated with the answerable request (i.e., recorded data stream) in the library of answerable requests 108—"Total Net Portfolio Value." Accordingly, the system 100 can determine that the request is associated with the library of answerable requests 108. The system 100 can answer the user's request with the related asset information, which, in the example above, can include providing "Today's Net Portfolio Value is $1,899,443" via any of the methods described herein, such as displaying the text above on the electronic display device 134 and/or audio voice data via the loud speaker(s) 138.

The memory device 102 can include a collection of favorite answerable requests 110. The collection of favorite answerable requests 110 can be a subset of the library of answerable request 108. The user can indicate selected answerable requests from the library of answerable requests 108 to add to the collection of favorite answerable requests 110. In some embodiments, the system 100 can automatically create and/or organize the collection of favorite answerable requests 110 based on the user's activity.

The collection of answerable requests 110 can be displayed via the electronic display device 134 and selected by the user for submission to the system 100 as a request. The collection of answerable requests 110 can enable the user to quickly submit favorite requests to the system 100. For example, the user may frequently ask only 8 requests. Accordingly, the user can add the frequently asked 8 requests to the collection of answerable requests 110 to enable the user to quickly submit the user's favorite requests. For example, if not using the microphone(s) 142, the user may indicate answerable request for submission from the displayed library of answerable requests 108. Scrolling through 80, 90, or 100 answerable requests can be inefficient when attempting to find a few select favorites. Accordingly, the user can navigate to the collection of favorite answerable requests 110 and quickly review the user's favorites to select the desired request, which may involve reviewing a fewer number of request to find the desired request.

Figure 13:
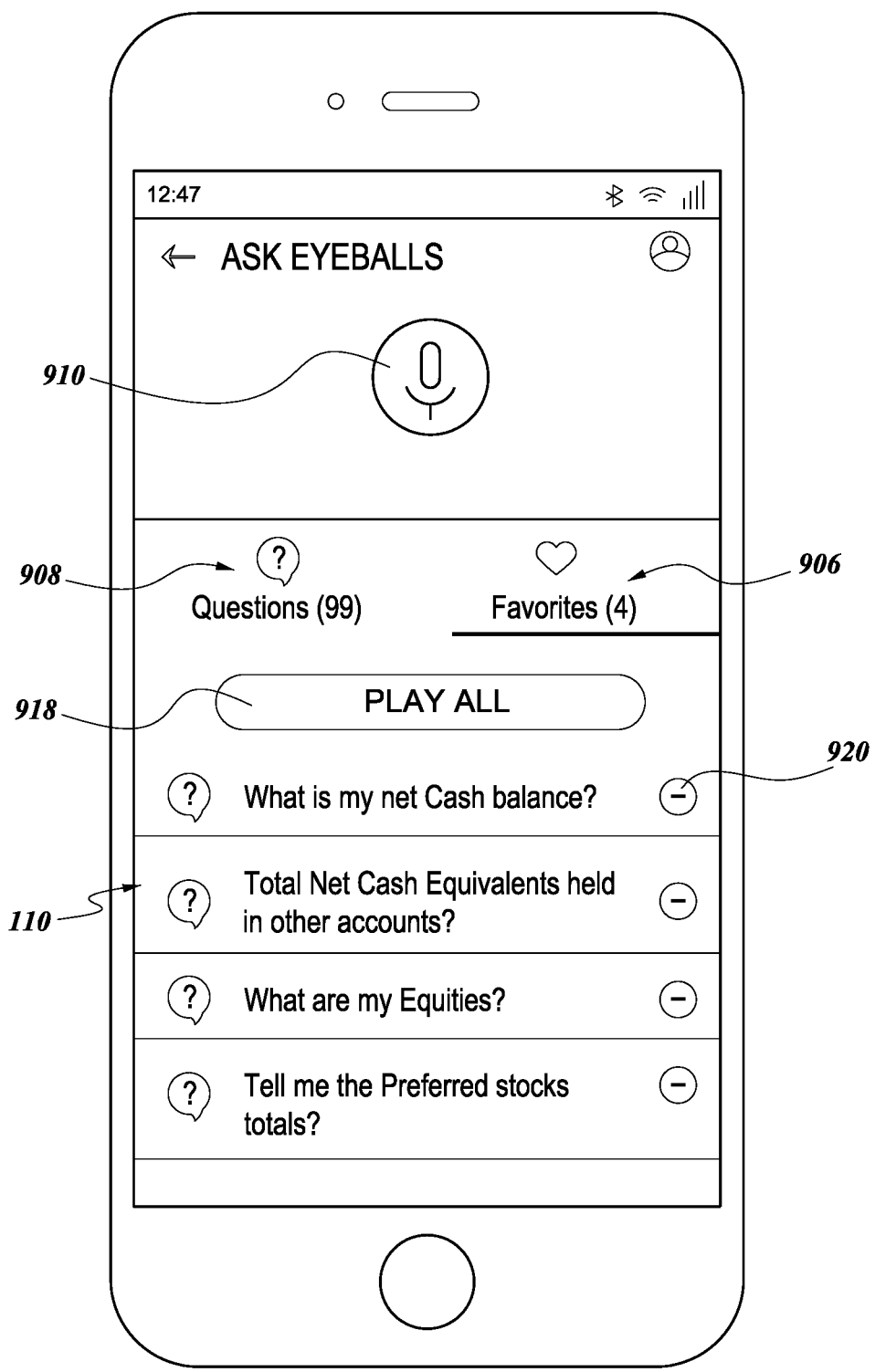

As described in reference to FIG. 9, the user can select/indicate, via the touchscreen(s) 140, the favorite icon 904 (e.g., heart shaped icon) that is associated with an answerable request, which can add the indicated answerable request to the collection of favorite answerable requests 110. The system 100 can change the favorite icon 904 to be a different color, filled in, and/or otherwise changed to signify that the answerable request has been added to the collection of favorite answerable requests 110, as shown by the selected favorite icon 905 shown in FIG. 9. The user can remove the answerable request from the collection of favorite answerable requests 110 by selecting/indicating, via the touchscreen(s) 140, the selected favorite icon 905, which can revert to appearing as the favorite icon 904. Accordingly, the favorite icon 904 can be used as a toggle button to add and/or remove answerable requests from the collection of answerable favorite requests 110. In some embodiments, an answerable request can be removed from the collection of favorite answerable requests 110 by navigating to the display of the collection of favorite answerable requests 110 and indicating, via the touchscreen(s) 140, the remove icon 920 (e.g., minus icon) as shown in FIG. 13. The system 100 can include a play all function for the collection of favorite answerable requests 110 such that all of the answerable requests in the collection of favorite answerable requests 110 can be submitted to the system 100 for response, which can be conveyed via text display and/or audio output. The collection of favorite answerable requests 110 can be stored on the secure database and server 132 for the user's quick reference. In some embodiments, the answerable requests in the collection of favorite answerable request 110 can be isolated within the user's financial portfolio account statement data from the secure database and server for identification and activation to answer a submitted request.

The memory device 102 can include an advisor response queue 114. The advisor response queue 114 can include requests that are for an advisor associated with the user to answer. In some embodiments, the advisor response queue 114 can include user's requests that cannot be answered by the system 100 (e.g., requests not associated with the library of answerable requests 108). For example, upon determining that a request cannot be answered by the system 100 (e.g., the request is not associated with the library of answerable requests 108), the system 100 can add the request to the advisor response queue 114. In some embodiments, the advisor response queue 114 can include user's requests that include one or more words calling for an opinion, such as should, would, better, best, and/or other words or combinations of words. For example, upon identifying one or more words calling for an opinion, the system 100 can add the user's request to the advisor response queue 114. Optionally, the system 100 filters user's requests that are not associated with the library of answerable requests 108 and/or user's requests that include one or more words calling for an opinion that are to be added to the advisor response queue 114. For example, the system 100 may determine whether the request is in the indicated field by comparing one or more words in the user's request with one or more words in the compilation of contextual terminology 112 before adding the user's request to the advisor response queue 114, as described elsewhere herein.

The advisor response queue 114 can be accessible to the user's advisor and/or system administrator. In some embodiments, the advisor response queue 114 can be stored on the secure database and server 132. In some embodiments, the advisor response queue 114 can be stored in the user's financial portfolio account statement data on the secure database and server 132. In some embodiments, the advisor response queue 114 can be accessed by the advisor and/or system administrator via a portal of the secure database and server 132. The advisor response queue 114 can capture and allow the advisor and/or administrator to view the requests (e.g., financial questions) that are of interest to the user through user engagement with the system 100. The advisor response queue 114 can store the requests that are of interest to the user, which can include storing the request into the user financial portfolio account statement data in the secure database and server 132. This can provide invaluable information to the advisor as to the interests of the user, which can enable the advisor to better assist users.

In some embodiments, the system 100 can generate a prepopulated email based on a request added to the advisor response queue 114. For example, a user's request asking "Should I be buying stock?" might be added to the advisor response queue 114 and result in the automatic generation of a prepopulated email. The prepopulated email may include the user's name and email address and provide "I see that you might be interested in buying stock. When would be a convenient time for us to discuss buying stock over the phone?" The advisor can review and send the email to the user at the advisor's discretion. In some embodiments, an advisor and/or administrator can review all requests submitted by the user.

The memory device 102 can include a hint library 116 to facilitate improved processing of user's requests. The hint library 116 can associate one or more words with one or more words in the compilation of contextual terminology 112 and/or library of answerable requests 108. In some embodiments, the system 100 can send user's requests that are not in the indicated field and/or not associated with the library of possible requests 108 to a technician device 106 and/or automated system 122. In some embodiments, the requests are sent to the secure database and server 132 that can be accessed by an administrator and/or the automated system 122. In some embodiments, the administrator can review the requests to associate one or more words in the requests with one or more words in the compilation of contextual terminology 112 and/or library of possible requests 156. In some embodiments, the system 100 can create the hint library 116.

For example, the administrator might see that the request "What are my Total Net Acids?" is being frequently submitted by one or more users. This can be due to the natural-language interpretation engine 118 understating the user saying "assets" to mean "acids," which could result in the user's request erroneously being determined to not be in the indicated field and/or not associated with the library of answerable requests 108. Accordingly, the administrator can associate the word "acids" with "assets" in the hint library 114 such that the system 100 will understand "acids" to mean "assets" when spoken by the user. Specifically, the word "acids" can be associated with the word "assets" in the compilation of contextual terminology 112. Consequently, the hint library 114 can improve the accurate processing of user requests. In fact, an embodiment of the system 100 has interpreted users' request with approximately 92% accuracy during trials, which is superior to other speech-to-text systems which perform at accuracy rates in the 70% and 80% ranges. In some embodiments, the automated system 122 and/or system 100 can develop a hint library 116 by automatically associating one or more words in users' requests with one or more words in the compilation of contextual terminology 112 and/or library of answerable requests 108 to improve the response accuracy of the system 100.

Figure 2:
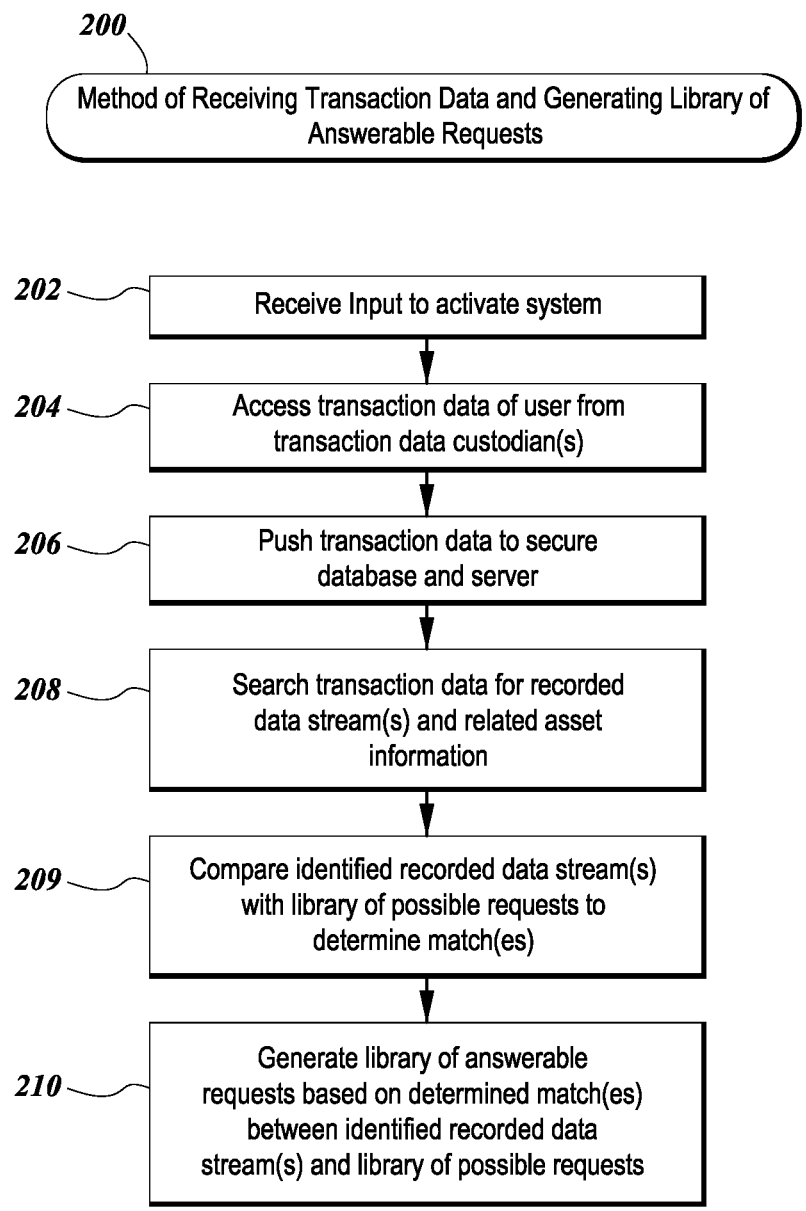
FIG. 2 illustrates an example method of receiving transaction data and programmatically generating a library of answerable requests.

FIG. 2 is a flow diagram depicting an example method of receiving transaction data and generating a library of answerable requests 200, according to some embodiments. The flow diagram is provided for the purpose of facilitating description of aspects of some embodiments. The diagram does not attempt to illustrate all aspects of the disclosure and should not be considered limiting.

At block 202, the system 100 can receive input to activate the system 100. The input can include input from the user via the touch screen(s) 140, microphone(s) 142, point device(s) 144, camera(s) 146, and/or keyboard(s) 148, which can include the user submitting a request. In some embodiments, the input can originate from the transaction data custodians 152. For example, the transaction data custodians 152 can send transaction data 154 to the system 100 as the transaction data 154 (e.g., financial portfolio account statement(s) of the user) is updated, which can activate the system 100. In some embodiments, the system 100 can self-activate on a periodic basis, such as daily, weekly, monthly, etc.

At block 204, the activated system 100 can access and/or receive transaction data 154 of the user from the transaction data custodians 152 via the transaction data interface 130. In some embodiments, the electronic processor 120 can execute instructions 104, which can include an API and/or custom API, stored on the memory device 102 to access and/or receive the transaction data 154 of the user from the transaction data custodians 152 (e.g., financial databases and servers). In some embodiments, the system 100 alerts the transaction data custodians 152 and the transaction data custodians 152 push transaction data 154 to the system 100.

At block 206, the activated system 100 can push the transaction data 154 to the secure database and server 132. The transaction data 154 can be accessed by the system 100, advisor of the user, and/or administrator as needed. In some embodiments, some or all of the transaction data 154 of the user can be input and/or pushed to the device of the user, such as the electronic display device 134.

At block 208, the system 100 can search the transaction data 154 and identify recorded data streams and asset-related financial information. As described elsewhere herein, the transaction data 154 of the user can include the financial portfolio account statement data provided by the financial institution of the user. The transaction data 154 provided by the financial institution can include numerous recorded data streams of asset-related financial information. The recorded data streams can include words, such as one or more subject words and/or qualifier words, that describe the recorded data stream. For example, the system 100 may search the transaction data 154 of the user and identify a recorded data stream, such as "Total Net Portfolio Value" that is associated with the qualifier "today" and related asset information "$1,899,443.00." In some embodiments, the system 100 searches for and identifies words (e.g., one or more subject words and/or qualifier words) in the transaction data 154 from the compilation of contextual terminology 112 to identify recorded data streams and qualifiers (e.g., current, today, yearly, year, etc.). In some embodiments, the system 100 can search the transaction data 154 for individual words from the compilation of contextual terminology 112 such as "portfolio" or phrases such as "total net portfolio value" to identify recorded data streams.

At block 209, the system 100 can compare identified recorded data stream(s) with possible requests in the library of possible requests 156 to determine association or a match. Stated differently, the system 100 can compare the identified words (e.g., one or more subject words and/or qualifier words) in the transaction data 154 that are indicative of a recorded data stream with the possible requests in the library of possible requests 156. An association or match indicates that the transaction data 154 includes an answer (e.g., asset-related financial information) for the possible request such that the possible request is an answerable request.

At block 210, the system 100 can generate the library of answerable requests 108 based on the match(es) between the identified recorded data stream(s) and the library of possible requests 156. Stated differently, the system 100 can generate the library of answerable requests 108 based on possible requests in the library of possible requests 156 that are identified as an answerable request at block 209. The system 100 can create a library of answerable requests 108 which can vary from user to user based on the transaction data 154 of the user. For example, the system 100 may add the possible request "What is today's Total Net Portfolio Value?" or "Tell me today's Total Net Portfolio Value?" to the library of answerable requests 108. The related asset information "$1,899,443.00" can be associated with the answerable request as the answer, such that the system 100 can quickly answer the user's request if the answerable request above is submitted to the system 100. The library of answerable requests 108 and related answers can be stored in the memory device 102, pushed to the user's device (e.g., electronic display device 134), displayed for the user via the electronic display device 134, stored on the secure database and server 132, and/or output as audio voice data via the loud speaker(s) 138. In some embodiments, the library of answerable request 108 can be displayed and selected by the user via touchscreen(s) 140, as shown in FIG. 9.

Figure 3:
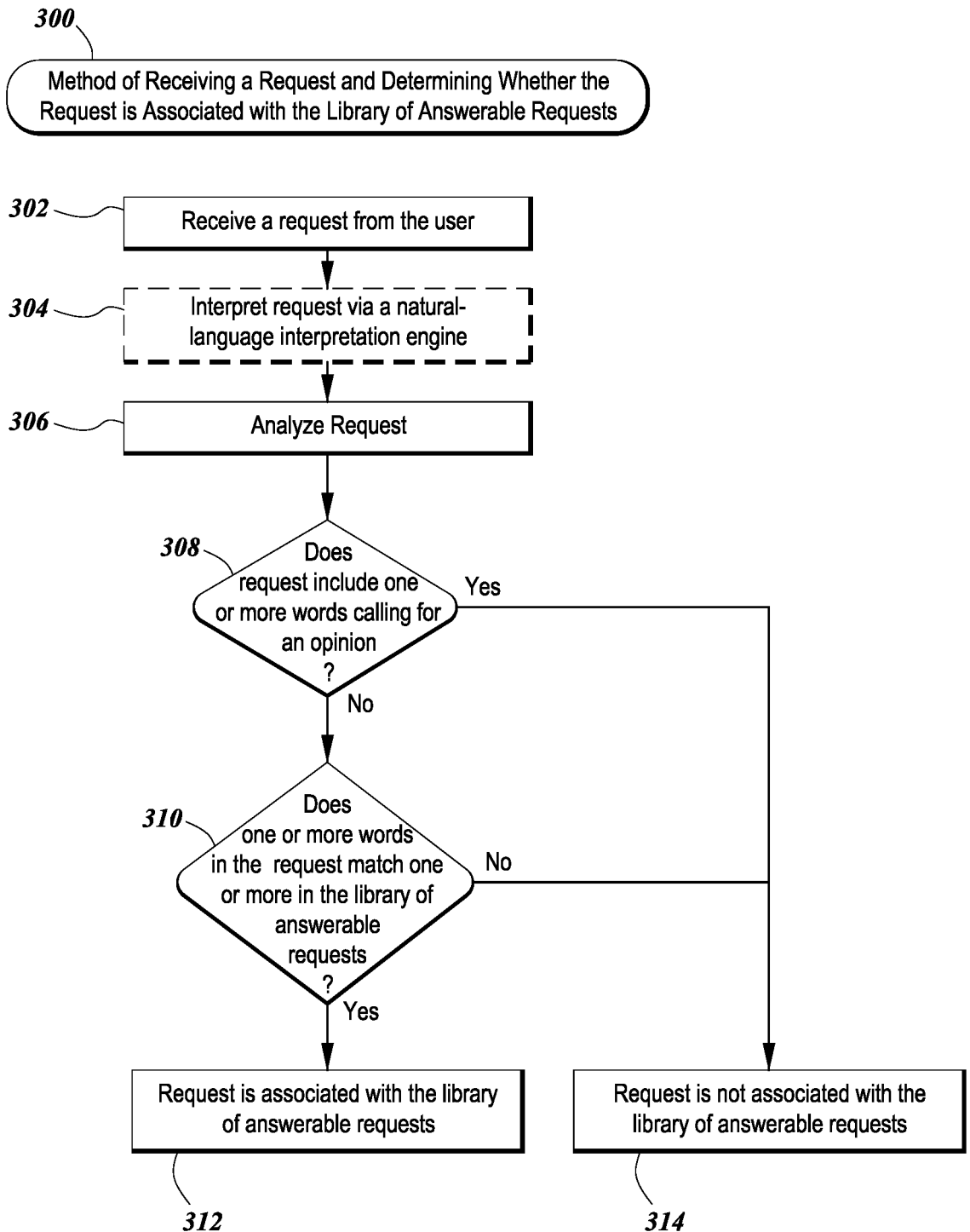
FIG. 3 illustrates an example method of receiving a request and determining whether the request is associated with the library of answerable requests.

FIG. 3 is a flow diagram depicting an example method of receiving a request and determining whether the request is associated with the library of answerable requests 300, according to some embodiments. The flow diagram is provided for the purpose of facilitating description of aspects of some embodiments. The diagram does not attempt to illustrate all aspects of the disclosure and should not be considered limiting.

At block 302, the electronic advisor assistant system 100 can receive a request from the user. As described elsewhere herein, the system 100 can receive a user request via any of the touchscreen(s) 140, microphone(s) 142, point device(s) 144, camera(s) 146, and/or keyboard(s) 148. In some embodiments, the user can speak into the microphone(s) 142 to submit a request. In some embodiments, the user can touch the touchscreen(s) 140 at the microphone icon 910 shown in FIG. 9 to activate the microphone(s) 142 and speak into the microphone(s) 142 to submit a request. In some embodiments, the user can touch the touchscreen(s) 140 to select an answerable request from the displayed, via the electronic display device 134, library of answerable requests 108 to submit a request, as shown FIG. 9. In some embodiments, the user can touch the touchscreen(s) 140 to select a favorite answerable request from a displayed, via the electronic display device 134, collection of requests 110 to submit a request, as shown in FIG. 13.

At block 304, the system 100 can optionally interpret the request received at block 302 via the natural-language interpretation engine 118. As described elsewhere herein, the natural-language interpretation engine 118 can convert speech into text to enable the system 100 to process the request. Accordingly, the natural-language interpretation engine 118 can be activated when the request received at block 302 is an audio request (e.g., spoken request) received via the microphone(s) 142. The natural-language interpretation engine 118 can be the Flutter speech-to-text application by Google or a similar speech-to-text interpretation engine. The natural-language interpretation engine 118 may not be activated when the user selects a request from a displayed library of answerable requests 108 or the request is submitted via one of the other mechanisms provided elsewhere herein.

At block 306, the system 100 can analyze the request. The system 100 can deconstruct the request. For example, the system 100 can identify one or more subject word(s), qualifier word(s), and/or opinion word(s) in the request. In some embodiments, the system 100 can use the compilation of contextual terminology 112 to analyze or process the request from the user. For example, the system 100 can receive a request from the user and search within the request for one or more words from the compilation of contextual terminology 112 and, upon identifying one or more matched words between the request and the compilation of contextual terminology 112, use the matched words to identify if the request is associated with the library of answerable requests 108, as described elsewhere herein.

At decision state 308, the system 100 can determine if the request includes one or more words calling for an opinion, such as should, would, better, best, and/or other words or combinations of words. As described elsewhere herein, requests calling for an opinion should be directed to the advisor of the user, rather than answered by the system 100. The compilation of contextual terminology 112 can include one or more words indicative of a request asking for an opinion. Accordingly, a match between one or more words in the request and one or more words in the compilation of contextual terminology 112 that are indicative of a request asking for an opinion can signify that the request is indeed asking for an opinion. Accordingly, if one or more words calling for an opinion is present in the request, the process can proceed to block 314. At block 314, the system 100 determines that the user's request is not associated with the library of answerable requests 108. Accordingly, as described elsewhere herein, the system 100 can indicate to the user that the request should be directed to the advisor, the system 100 cannot answer the request, and/or the system 100 can forward the request to an advisor response queue 114. If the request does not include one or more words calling for an opinion, the process can proceed to decision state 310.

At decisions state 310, the system 100 can determine if one or more words in the request matches one or more words in the library of answerable requests 108. The electronic processor 120 can execute the instructions 104 stored on the memory device 102 to compare one or more words in the user's request with one or more words in the library of answerable requests 108 to determine if the request is associated with the library of answerable requests 108. In some embodiments, the system 100 can search the library of answerable requests 108 to find a corresponding subject word and/or qualifier word that matches the subject word and/or qualifier word in the request, which can indicate that the request relates to a recorded data stream of the user's transaction data 154. In some embodiments, as explained elsewhere herein, the system 100 can search the library of answerable requests 108 using the word(s) in the request that matched or were associated with one or more words in the compilation of contextual terminology 112.

If the one or more words of the request do not match one or more words of the library of answerable request 108, the process can proceed to block 314 and the system 100 can determine that the request is not associated with the library of answerable requests 108. Accordingly, as described elsewhere herein, the system 100 can indicate to the user that the system 100 cannot answer the request and/or does not understand the request. If the one or more words of the request do match one or more words of the library of answerable requests 108 (e.g., matching one or more subject word(s) and/or qualifier word(s)), the process can proceed to block 312 and determine that the request is associated with the library of answerable requests 108. Accordingly, as described elsewhere herein, the system 100 can indicate to the user the answer that is associated with the specific answerable request with which the request is associated (e.g., indicate the asset information that is related to the recorded data stream associated with the answerable request). In some embodiments, the process of determining whether a request is associated with the library of answerable requests 108 can include one of decision state 308 or 310. In some embodiments, the process of determining whether a request is associated with the library of answerable requests 108 can include more than the decision states 308 and/or 310.

Figure 4:
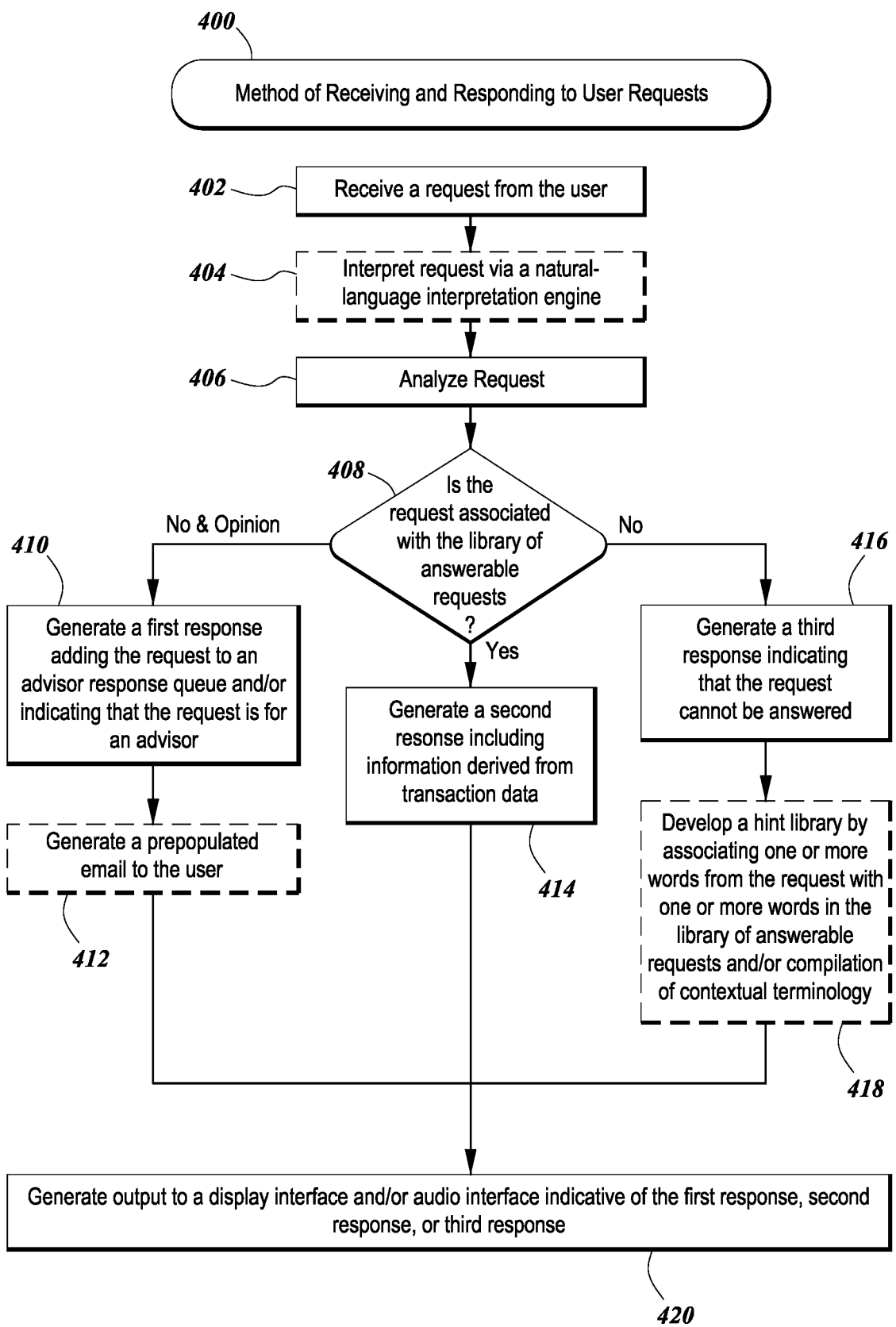
FIG. 4 illustrates an example method of receiving and responding to user requests.

FIG. 4 is a flow diagram depicting an example method of receiving and responding to user requests 400, according to some embodiments. The flow diagram is provided for the purpose of facilitating description of aspects of some embodiments. The diagram does not attempt to illustrate all aspects of the disclosure and should not be considered limiting.

Blocks 402, 404, and 406 can be the same as blocks 302, 304, and 306, respectively, as described in reference to FIG. 3.

At decision state 408, the system 100 can determine if the request of the user is associated with the library of answerable requests 108, which can include the description in reference to the decision states 308 and 310 described in reference to FIG. 3. The system 100 can determine if the request includes one or more words calling for an opinion, such as should, would, better, best, and/or other words or combinations of words. If one or more words calling for an opinion is present in the request, the process can proceed to block 410. The system 100 can determine if one or more words in the request matches one or more words in the library of answerable requests 108. The electronic processor 120 can execute the instructions 104 stored on the memory device 102 to compare one or more words in the user's request with one or more words in the library of answerable requests 108 to determine if the request is associated with the library of answerable requests 108. In some embodiments, the system 100 can search the library of answerable requests 108 to find a corresponding subject word and/or qualifier word that matches the subject word and/or qualifier word in the request, which can indicate that the request relates to a recorded data stream of the user's transaction data 154. If the one or more words of the request do not match one or more words of the library of answerable requests 108 and the system 100 does not identify one or more words calling for an opinion, the process can proceed to block 416. If the one or more words of the request do match one or more words of the library of answerable requests 108 (indicating a recorded data stream) and the system 100 does not identify one or more words calling for an opinion, the process can proceed to block 414.

At block 410, the system 100 can generate a first response. The first response can include indicating that the user's request cannot be answered by the system 100, the request should be answered by the advisor of the user, and/or that the user should seek the advice of the advisor. The first response can include adding the request to an advisor response queue 114. The advisor response queue 114 can include requests that should be answered by an advisor, which can include requests that ask for an opinion, discretion, etc. For example, a request such as "Should I invest in more mutual funds?" could be added to the advisor response queue 114 because the request calls for an opinion and/or discretion of an advisor, rather than a factual answer. In some embodiments, all requests that are not associated with the library of answerable requests 108 are added to the advisor response queue 114.

In some embodiments, further filtering can prohibit irrelevant requests from being added to the advisor response queue 114. For example, the system 100 can compare one or more words in the request with one or more words in a compilation of contextual terminology 112 and/or another compilation of words before adding the user's requests to the advisor response queue 114. If no match is found between one or more words in the request and one or more words in the compilation of contextual terminology 112 and/or another compilation of words, the request may not be added to the advisor response queue 114. This can ensure that irrelevant requests are not sent to the advisor for review. For example, in the financial field, a question such as "Should I wear a jacket today?" could be prevented from being added to the advisor response queue 114.

The advisor response queue 114 can be stored on the memory device 102, secure database and server 132, and/or another suitable location. The advisor response queue 114 can be accessible and/or viewable to the user's advisor (e.g., via the advisor electronic display device 150) and/or system administrator (via the technician device 106), which can provide valuable insight into the interests of the user. The advisor can review the advisor response queue 114 and contact users to follow up on users' interest. In some embodiments, the advisor response queue 114 can also establish a record of the user's interest and inquiries. For example, the advisor response queue 114 can establish a record that the user inquired about purchasing an asset and when that inquiry occurred. In some embodiments, the system 100 can record all users' inquiries for record keeping, which can be reviewed by the advisor and/or administrator.

At block 412, the system 100 can generate a prepopulated email based on a request added to the advisor response queue 114. For example, a user's request asking "Should I be buying stock?" might be added to the advisor response queue 114 and result in the automatic generation of a prepopulated email. The prepopulated email may include the user's name and/or email address and provide "I see that you might be interested in buying stock. When would be a convenient time for us to discuss buying stock over the phone?" or similar message. The advisor can review and send the email to the user at the advisor's discretion. This can enable an advisor to quickly and efficiently follow up on users' inquiries and provide better service.

At block 416, the system 100 can generate a third response indicating that the request cannot be answered by the system 100 and/or that the system 100 does not understand the request.

At block 418, the system 100 can send the user's requests to a technician device 106 and/or automated system 122 to build a hint library 116. In some embodiments, the requests are sent to the secure database and server 132 and/or another location that can be accessed by an administrator and/or the automated system 122 to build a hint library 116. The hint library 116 can associate one or more words from the request with one or more words in the compilation of contextual terminology 112 and/or library of answerable requests 108. In some embodiments, the administrator and/or automated system 122 can review the requests to associate one or more words in the requests with one or more words in the compilation of contextual terminology 112 and/or library of answerable requests 108. For example, the administrator and/or automated system 122 might see that the request "What are my Total Net Acids?" is frequently submitted by one or more users. This can be due to the natural-language interpretation engine 118 understating the user saying "assets" to mean "acids," which could result in the user's request erroneously being determined to not be associated with the library of answerable requests 108. This could be particularly problematic for user's with an accent, speech impediment, and/or other condition. Accordingly, the administrator and/or automated system 122 can associate the word "acids" with "assets" in the hint library 114 such that the system 100 will understand "acids" to mean "assets" when spoken by the user, which can improve the response accuracy of the system 100. In some embodiments, requests that are sent to the advisor response queue 114 can also be reviewed by an administrator and/or automated system 122 to build a hint library 114 and/or for other purposes.

At block 414, the system 100 can generate a second response. The second response can include indicating an answer to the user's request. As described elsewhere herein, the process can arrive at block 414 when one or more words in the request match with one or more words in the library of answerable requests 108 (i.e., indicating a possible recorded data stream). Stated differently, the process can arrive at block 414 when a subject word or subject word(s) and qualifier word(s) in the request match with one or more subject word or subject word(s) and qualifier word(s) in an answerable request of the library of answerable requests 108. Accordingly, the second response can include the answer (e.g., related asset information) related to the associated answerable request of the library of answerable requests 108. For example, the user's request may be "What is my Total Net Portfolio Value?" The system 100 may have searched the library of answerable requests 108 for a matching subject word and/or qualifier and identified an answerable request in the library of answerable requests 108 that included "Total Net Portfolio Value" and "today." Accordingly, the system 100 may have determined that the user's request is associated with the library of answerable requests 108 and, specifically, with the answerable request with the subject word and qualifier word above. Accordingly, the system 100 can generate a response incorporating the answer (related asset information) related to the associated answerable request in the library of answerable requests 108. For example, the second response may include the value of $1,899,443 (related asset information) associated with the answerable request. Accordingly, the system 100 can generate a second response providing "Today's Net Portfolio Value is $1,899,443."

At block 420, the system 100 can generate an output to the electronic display device 134 via the display interface 122 and/or the loud speaker(s) 138 via the audio interface 124 indicative of the first, second, or third response. For example, text may be displayed via the electronic display device 134 and/or audio voice data (e.g., audible message) emitted via the loud speaker(s) 138 to convey the contents of the first, second, or third response.

Figure 5:
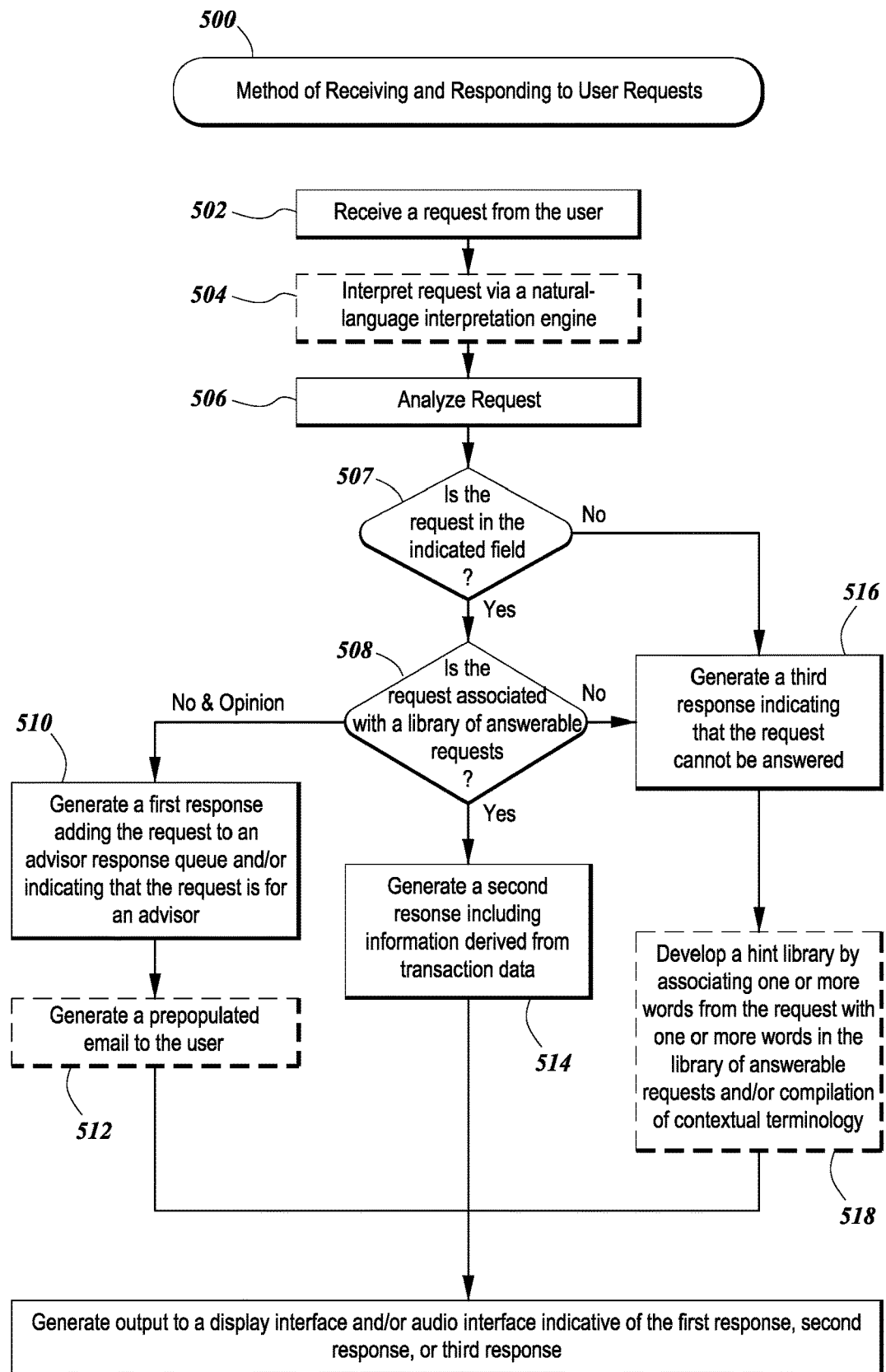
FIG. 5 illustrates an example method of receiving and responding to user requests.

FIG. 5 is a flow diagram depicting an example method of receiving and responding to user requests 500, according to some embodiments. The flow diagram is provided for the purpose of facilitating description of aspects of some embodiments. The diagram does not attempt to illustrate all aspects of the disclosure and should not be considered limiting. The method 500 illustrated in FIG. 5 can be the same as the method 400 illustrated in FIG. 4, aside from the illustrated and/or described differences. Accordingly, blocks 502, 504, 506, 510, 512, 514, 516, 518, and/or 520 can be the same as blocks 402, 404, 406, 410, 412, 414, 416, 418, and/or 420, respectively. Decision state 508 can be the same as decision state 408.

At decision state 507, the system 100 can determine if the request is in the indicated field. As described elsewhere herein, the memory device 102 can include a compilation of contextual terminology 112. The compilation of contextual terminology 112 can include words that identify expressions relevant to an indicated field of the electronic advisor assistant system 100. For example, the compilation of contextual terminology 112 can include words that identify expressions relevant to the financial field, such as word(s) relevant to the transaction data 154 as described herein. In some embodiments, the compilation of contextual terminology 112 can be created by an administrator of the system 100, words derived from the transaction data 154 of the user, words from the library of possible requests 156, and/or other sources. The system 100 can use the compilation of contextual terminology 112 to identify irrelevant requests (e.g., requests not related to the indicated field). The electronic processor 120 can execute instructions 104 stored on the memory device 102 to compare word(s) in the user's request with word(s) in the compilation of contextual terminology 112 to determine if the user's request is in the indicated field (e.g., the relevance of the user's request). If there is a match between one or more words in the user's request and one or more words in the compilation of contextual terminology 112, the system 100 can determine that the user's request is in the indicated field and the process can proceed to decision state 508. If there is not a match between one or more words in the user's request and one or more words in the compilation of contextual terminology 112, the system 100 can determine that the user's request is not in the indicated field and proceed to block 516. In some embodiments, decision state 507 and 508 can be combined.

Figure 6:
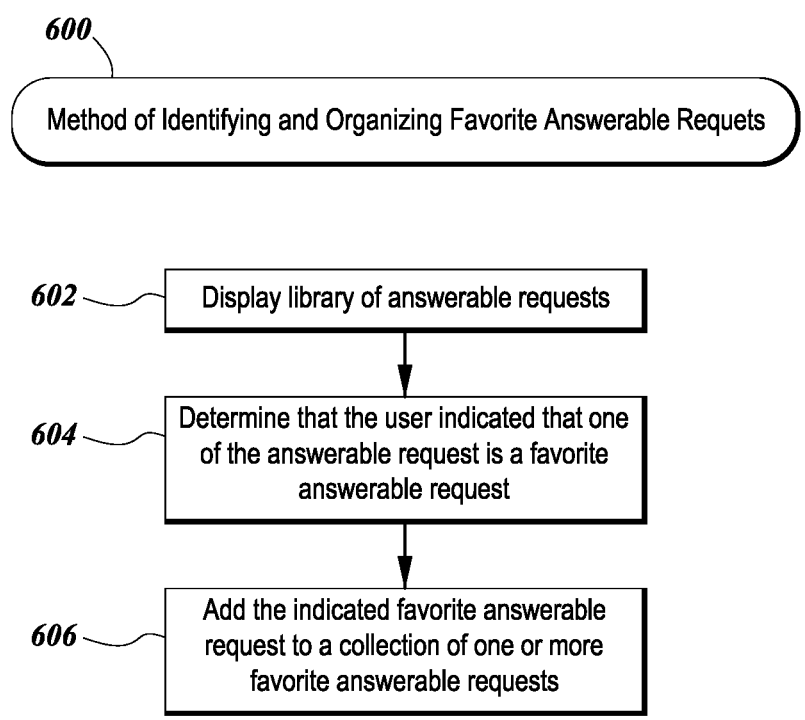
FIG. 6 illustrates an example method of identifying and organizing favorite answerable requests of the user.

FIG. 6 is a flow diagram depicting an example method of identifying and organizing favorite answerable requests, according to some embodiments. The flow diagram is provided for the purpose of facilitating description of aspects of some embodiments. The diagram does not attempt to illustrate all aspects of the disclosure and should not be considered limiting.

At block 602, the system 100 can display the library of answerable requests 108, which can be generated via the method 200 illustrated in FIG. 2 and the GUI shown in FIG. 9. The library of answerable requests 108 can be displayed via the display 136 of the electronic display device 134, which can be the touchscreen(s) 140.

At block 604, the system 100 can determine that the user indicated that one of the answerable requests is a favorite answerable request. For example, the system 100 can determine that the user touched the touchscreen(s) 140 at a favorites icon 904 (e.g., heart shaped icon), as shown in FIG. 9, to indicate that an associated answerable request form the library of answerable requests 108 is a favorite answerable request. As described in reference to FIG. 9, the selected favorite icon 905 of an answerable request can be a different color, filled in, and/or otherwise change to signify that the indicated answerable request has been added to the collection of answerable requests. The user can touch the touchscreen(s) 140 at the selected favorite icon 905 that is a different color, filled in, and/or otherwise in a changed state to remove the indicated answerable request from the collection of favorite answerable requests 110.

At block 606, the system 100 can add the indicated favorite answerable request to the collection of favorite answerable requests 110, which can be displayed as shown in FIG. 13. The user can quickly navigate between displaying the library of answerable requests 108 and the collection of favorite answerable requests 110 as described in reference to FIG. 13. The collection of favorite answerable requests 110 can enable a user to quickly navigate to the requests that the user frequently wants to ask via touching the touchscreen(s) 140 without scrolling through the entire library of answerable requests 108. The user can touch the touchscreen(s) 140 at a displayed favorite answerable request to quickly submit a request. The user can remove a favorite answerable request from the collection of favorite answerable requests 110 by touching the remove icon 920. The user can request that the system 100 answer all of the favorite answerable requests included in the collection of favorite answerable requests 110 via a verbal request and/or by indicating the "play all" icon 918, as illustrated in FIG. 13. This can allow a user to quickly request answers to all the favorite answerable requests included in the collection of favorite answerable requests 110.

Figure 7:
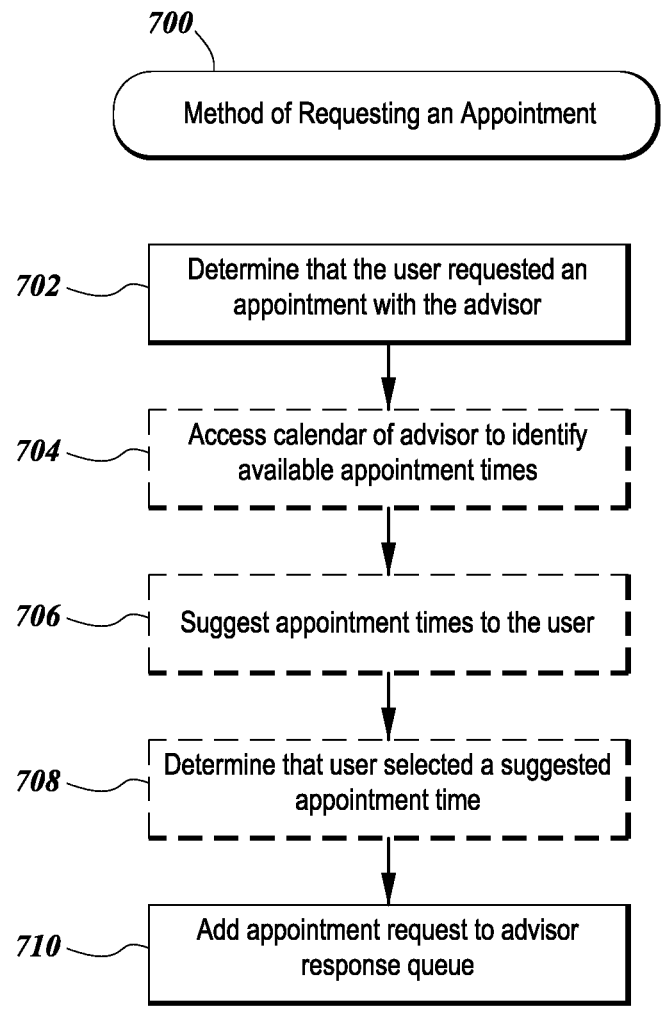
FIG. 7 illustrates an example method of requesting an appointment with an advisor.

FIG. 7 is a flow diagram depicting an example method of requesting an appointment with an advisor, according to some embodiments. The flow diagram is provided for the purpose of facilitating description of aspects of some embodiments. The diagram does not attempt to illustrate all aspects of the disclosure and should not be considered limiting.

At block 702, the system 100 can determine that the user requested an appointment with the advisor. As described elsewhere herein, the system 100 can receive a user request via any of the touchscreen(s) 140, microphone(s) 142, point device(s) 144, camera(s) 146, and/or keyboard(s) 148. The system 100 can receive a request from the user via the methods described in reference to block 302 in FIG. 3. In some embodiments, the user can touch the advisor icon 808, shown in FIG. 8, to navigate to an interface to submit an appointment request. In some embodiments, various potential appointment times can be displayed that the user may choose from to submit an appointment request. In some embodiments, the user can propose a specific appointment time.

At block 704, the system 100 may optionally access the calendar of an advisor associated with the user to identify potential available appointment times. In some embodiments, the advisor can indicate to the system 100 potential available appointment times. As available appointment times are filled on the advisor's calendar, the system 100 may recognize the filled appointment time is no longer available and not suggest the filled time.

At block 706, the system 100 may optionally suggest appointment times to the user based on the identified potential available appointment times. The system 100 can display and/or emit audio voice data regarding the suggested appointment times to the user.

At block 708, the system 100 may optionally determine that the user selected a suggested appointment time. The system 100 can determine that the user indicated a displayed appointment time via any of the touchscreen(s) 140, microphone(s) 142, point device(s) 144, camera(s) 146, and/or keyboard(s) 148. For example, in some embodiments, the system 100 can determine that the user indicated a displayed appointment time by touching the touchscreen(s) 140. In some embodiments, the system 100 can receive input via the microphone(s) 142, which is converted into text, and identify a suggested time that matches a time stated in the request of the user to determine that the user selected a suggested appointment time.

At block 710, the system 100 can add the appointment request to the advisor response queue 114. The submitted appointment request can be reviewed by the advisor and/or administrator. The advisor and/or administrator can contact the user regarding finalizing an appointment time. In some embodiments, the system 100 can generate a prepopulated email to the user based on the appointment request, which the advisor can review and send at the advisor's discretion, as described in reference to block 412 in FIG. 4.

FIGS. 8-13 illustrate various graphical user interfaces (GUIs) that can be displayed by the system 100 via the electronic display device 134. As described elsewhere herein, the display 136 of the electronic display device 134 can be a touchscreen(s) 140 to receive user input via touching.

Figure 8:
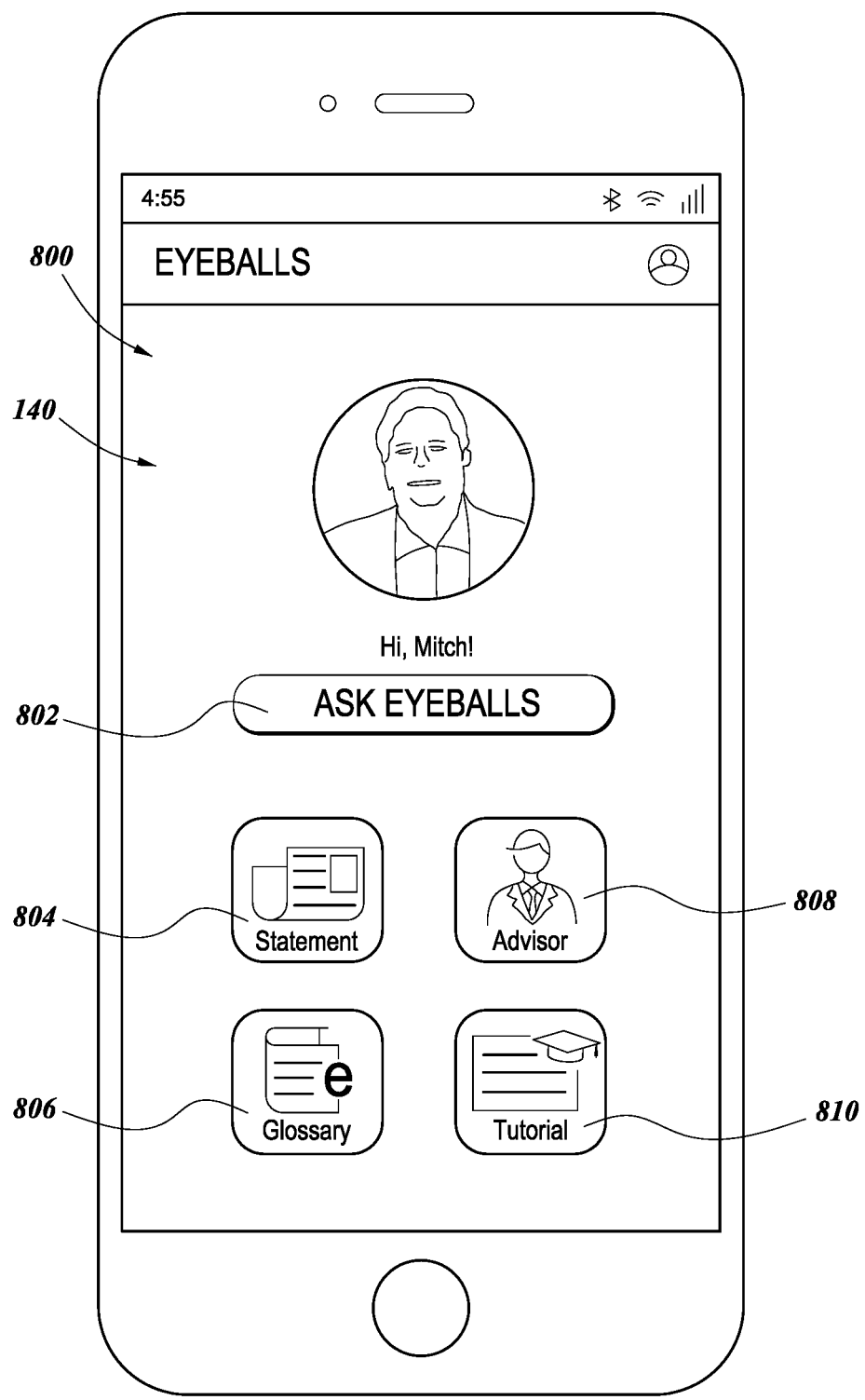
FIGS. 8-13 illustrate example graphical user interfaces (GUIs) that can be displayed for the system and methods disclosed herein.

FIG. 8 illustrates an example GUI for a main menu interface 800, which can be displayed via the touchscreen(s) 140. The main menu interface 800 can include selectable icons that the user can indicate/select via the touchscreen 140 to navigate to other interfaces. For example, the main menu interface 800 can include a statement icon 804. If the statement icon 804 is selected, the user can be directed to an interface through which the user can review transaction data 154 form the user's financial portfolio account statement(s). The main menu interface 800 can include a glossary icon 806. If the glossary icon 806 is selected, the user can be directed to a glossary interface through which the user can review financial terms and definitions to learn financial vocabulary and/or other vocabulary. The main menu interface 800 can include a tutorial icon 810. If the tutorial icon 810 is selected, the user can be directed to a tutorial interface through which the user can learn how to navigate through the different interfaces displayed by the system 100, how to submit a request, how to interact with the system 100, and/or other useful information regarding the system 100. The main menu interface 800 can include an ask icon 802 (e.g., ask Eyeballs icon). If the ask icon 802 is selected, the user can be directed to ask-a-question interface 900, shown in FIG. 9. In some embodiments, the system 100 can be activated to perform the method 200, described in reference to FIG. 2, when the user accesses the main menu interface 800 and/or selects the ask icon 802. In some embodiments, the system 100 can access transaction data 154 that has been pushed to the secure database and server 132 on a periodic basis, when new transaction data 154 is available, when the user accesses the main menu interface 800, and/or when the user selects the ask icon 802 to develop the library of answerable requests 108. In some embodiments, the system 100 inputs transaction data 402 onto the device of the user and/or generates the library of answerable requests 108, which can be input on the device of the user, when the user accesses the main menu interface 800 and/or selects the ask icon 802. The main menu interface 800 can include an advisor icon 808. If the advisor icon 808 is selected, the user can be directed to an interface through which the user can access contact information of the user's advisor (e.g., phone, email, address, etc.) In some embodiments, the user can submit requests for an appointment through the interface or make a selection to initiate a call or text with the advisor via the user's device.

FIG. 9 illustrates an example GUI for an ask-a-question interface 900. The ask-a-question interface 900 can display the library of answerable requests 108. The user can scroll through the answerable requests of the library of answerable requests 108. The user, as described elsewhere herein, can indicate/select one of the answerable requests by touching the touchscreen(s) 140, which can submit the indicated request to the system 100. For example, the user could touch the touchscreen(s) 140 at the answerable request 902 (e.g., "Tell me today's total net portfolio value?"). The request "Tell me today's net portfolio value?" can be submitted to the system 100, and in response, the system 100 can display the associated answer of "The total net portfolio value today is 1,899,443 dollars," as shown in text response 912 in FIG. 10. The system 100, in addition or alternatively, can emit audio data via the loudspeaker(s) 138 indicating the response, which can include audio voice data comprising the contents of the text response 912 in FIG. 10.

As described elsewhere herein, answerable requests from the library of answerable requests 108 can be added to a collection of favorite answerable requests 110. Accordingly, the ask-a-question interface 900 can include favorite icon(s) 904 (e.g., heart-shaped icons) that can be associated with an answerable request in the displayed library of answerable requests 108. The favorite icon(s) 904 can function as a toggle to add and/or remove an answerable request from the collection of favorite answerable requests 110. For example, the user can indicate, via the touchscreen(s) 140, the favorite icon 904 that is associated with an answerable request, which can add the indicated answerable request to the collection of favorite answerable requests 110. The system 100 can change the favorite icon 904 to be a different color, filled in, and/or otherwise changed to signify that the answerable request has been added to the collection of answerable requests 110, as shown by the selected favorite icon 905. The user can remove the answerable request from the collection of favorite answerable requests 110 by indicating, via the touchscreen(s) 140, the selected favorite icon 905, which can revert to appearing as the favorite icon 904.

The user can navigate to a display of the collection of favorite answerable requests 110 by selecting the collection of favorites icon 906 via the touchscreen(s) 140. The collection of favorites icon 906 can display the number of favorite answerable requests in the collection of favorite answerable requests 110 (e.g., 3 in FIG. 9). The system 100 can display the collection of favorite answerable requests 100 as shown in FIG. 13, which can be scrolled through as needed. Answerable requests can be removed from the collection of favorite answerable requests by the user indicating, via the touchscreen(s) 140, the remove icon 920 (e.g., minus icon). The system 100 can also include a function for submitting all answerable requests in the collection of answerable requests 110 to the system 100 for response. For example, the ask-a-question interface 900 can include a play all icon 918. The user can indicate/select the play all icon 918, via the touchscreen(s) 140, to submit all answerable requests in the collection of answerable requests 110 to the system 100 for response. The system 100 can respond to each of the answerable requests in the collection of answerable requests 110 as described elsewhere herein. In some embodiments, the user can request via verbal commands that the system 100 answer all answerable requests in the collection of answerable requests 110. The user can navigate back to a display of the library of answerable request 108 via selecting the answerable request icon 908 with the touchscreen(s) 140. The answerable request icon 908 can display the number of answerable requests in the library of answerable requests 108 (e.g., 99 in FIG. 13).

The ask-a-question interface 900 can include a microphone icon 910. The microphone icon 910 can be indicated/selected by the user, via the touchscreen(s) 140, to activate the microphone(s) 142 such that the microphone(s) 142 can receive audio input (e.g., a spoken requests of the user) which can be analyzed/processed as described elsewhere herein. For example, the user can select the microphone icon 910 and state "Tell me today's Total Net Portfolio Value?" In response, the system 100 can display the associated answer of "The total net portfolio value today is 1,899,443 dollars," as shown in text response 912 in FIG. 10. The system 100, in addition or alternatively, can emit audio data via the loudspeaker(s) 138 indicating the response, which can include audio voice data comprising the contents of the text response 912 in FIG. 10. In another example, the user could select the microphone icon 910 and state "Is it going to rain today?" As described elsewhere herein, the system 100, in response, can determine that the user's request is not associated with the library of answerable requests 108 and/or not in the indicated field (e.g., financial field) and display the text response 914 shown in FIG. 11 of "Eyeballs does not understand that question. Please review list of questions." The system 100, in addition or alternatively, can emit audio data via the loudspeaker(s) 138 indicating the response, which can include audio voice data comprising the contents of the text response 914 in FIG. 11. In another example, the user could select the microphone icon 910 and state "Should I buy more stocks?" As described elsewhere herein, the system 100, in response, can determine that the user's request is not associated with the library of answerable requests 108 and/or includes one or more words calling for an opinion and display the text response 916 shown in FIG. 12 of "Eyeballs does not give financial advice please contact your financial advisor" or a similar message. The system 100, in addition or alternatively, can emit audio data via the loudspeaker(s) 138 indicating the response, which can include audio voice data comprising the contents of the text response 916 in FIG. 12.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Language of example or capability used herein, such as, among others, "can," "could," "might," "may," "e.g.," "some," "certain," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown and described features as applied to various example embodiments, omissions, substitutions, additions, and changes in the form and details of the devices or algorithms described can be made without departing from the spirit of the disclosure. Certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An electronic advisor assistant system for identifying and responding to context-specific requests received from a user, the system comprising:
    a display interface configured to output visual information to an electronic display device, wherein the display interface is configured to display a library of answerable requests;
    an audio interface configured to output electronically-generated sounds to a loudspeaker;
    an electronic user input interface configured to receive requests from the user via a touchscreen, a microphone, a pointing device, a camera, or a keyboard;
    an advisor interface configured to generate a display of requests received via the electronic user input interface and added to an advisor response queue;
    a transaction data interface configured to receive transaction data received from a plurality of custodians of transaction data; and
    a memory device comprising the library of answerable requests, a compilation of contextual terminology comprising words that identify expressions relevant to an indicated field of the electronic advisor assistant system, and instructions executable by an electronic processor, wherein the instructions, when executed by the electronic processor, are configured to cause the system to:
    receive, via the electronic user input interface, a request;
    determine, by the electronic processor, whether the request is in the indicated field by identifying words in the request that match the contextual terminology in the compilation;
    determine, by comparing one or more words in the request with the library of answerable requests, whether the request is associated with the library of answerable requests;
    when it is determined that the request is in the indicated field and is not associated with the library of answerable requests, generate a first response comprising adding the request to the advisor response queue;
    when it is determined that the request is in the indicated field and is associated with the library of answerable requests, programmatically generate a second response comprising information derived from the transaction data;
    when it is determined that the request is not in the indicated field, generate a third response comprising an indication that the request cannot be answered by the electronic advisor assistant system;
    generate an output to at least one of the display interface or the audio interface indicative of the first response, the second response, or the third response;
    determine that the user selected one of the answerable requests to submit as a request;
    determine that the user touched the touchscreen to indicate that one of the answerable requests is a favorite answerable request;
    in response to determining that the user touched the touchscreen to indicate that one of the answerable requests is the favorite answerable request, add the indicated favorite answerable request to a collection of one or more favorite answerable requests;
    determine that the user requested a response for all favorite answerable requests in the collection of favorite answerable requests; and
    in response to determining that the user requested the response for all favorite answerable requests in the collection of favorite answerable request, programmatically generate the second response comprising information derived from the transaction data for each favorite answerable request in the collection of favorite answerable requests.

2. The system of claim 1, wherein determining whether the request is associated with the library of answerable requests comprises determining whether the request comprises words calling for an opinion, wherein the request is not associated with the library of answerable requests when the request comprises words calling for an opinion.

3. The system of claim 1, wherein generating the first response comprises an indication that the request is for an advisor with access to the advisor response queue.

4. The system of claim 1, wherein generating the third response comprises sending the request to a technician to build a hint library, wherein the hint library associates one or more words from the request with one or more words in the contextual terminology in the compilation.

5. The system of claim 1, wherein generating the third response comprises an automated system analyzing the request to build a hint library, wherein the automated system automatically associates one or more words from the request with the contextual terminology in the compilation.

6. The system of claim 1, further comprising a natural-language interpretation engine that is configured to interpret the request received via the microphone.

7. The system of claim 1, wherein the instructions, when executed by the electronic processor, are configured to cause the system to:
generate the compilation of contextual terminology based on transaction data received from the plurality of custodians of transaction data.

8. The system of claim 1, wherein the instructions, when executed by the electronic processor, are configured to cause the system to:
generate the library of answerable requests based on transaction data received from the plurality of custodians of transaction data.

9. The system of claim 1, wherein generating the first response comprises programmatically prepopulating an email response to the user based on the request.

10. The system of claim 1, wherein the instructions, when executed by the electronic processor, are configured to cause the system to:
determine that the user requested an appointment with the advisor;
in response to determining that the user requested the appointment with the advisor, add the appointment request to the advisor response queue.

11. An electronic advisor assistant system for identifying and responding to context-specific requests received from a user, the system comprising:
a display interface configured to output visual information to an electronic display device, wherein the display interface is configured to display a library of answerable requests;
an audio interface configured to output electronically-generated sounds to a loudspeaker;
an electronic user input interface configured to receive request from the user via a touchscreen, a microphone, a pointing device, a camera, or a keyboard;
an advisor interface configured to generate a display of requests received via the electronic user input interface and added to an advisor response queue;
a transaction data interface configured to receive transaction data received from a plurality of custodians of transaction data; and
a memory device comprising the library of answerable requests and instructions executable by an electronic processor, wherein the instructions, when executed by the electronic processor, are configured to cause the system to:
receive, via the electronic user input interface, a request;
determine, by comparing one or more words in the request with the library of answerable requests and identifying one or more words in the request calling for an opinion, whether the request is associated with the library of answerable requests;
when it is determined that the request is not associated with the library of answerable requests based on the identification of one or more words in the request calling for an opinion, generate a first response comprising adding the request to the advisor response queue;
when it is determined that the request is not associated with the library of answerable requests based on comparing words in the request with the library of answerable request and one or more words in the request calling for an opinion are not identified, generate a third response indicating that the request cannot be answered;
when it is determined that the request is associated with the library of answerable requests, programmatically generate a second response comprising information derived from the transaction data;
generate an output to at least one of the display interface or the audio interface indicative of the first response, second response, or third response;
determine that the user selected one of the answerable requests to submit as a request;
determine that the user touched the touchscreen to indicate that one of the answerable requests is a favorite answerable request;
in response to determining that the user touched the touchscreen to indicate that one of the answerable requests is the favorite answerable request, add the indicated favorite answerable request to a collection of one or more favorite answerable requests;
determine that the user requested a response for all favorite answerable requests in the collection of favorite answerable requests; and
in response to determining that the user requested the response for all favorite answerable requests in the collection of favorite answerable request, programmatically generate the second response comprising information derived from the transaction data for each favorite answerable request in the collection of favorite answerable requests.

12. The system of claim 11, wherein generating the first response comprises an indication that the request is for an advisor with access to the advisor response queue.

13. The system of claim 11, wherein generating the first response comprises programmatically prepopulating an email response to the user based on the request.

14. The system of claim 11, wherein generating the third response comprises sending the request to a technician device to build a hint library, wherein the hint library associates one or more words from the request with one or more words in at least one of the answerable requests in the library of answerable requests.

15. The system of claim 11, wherein the instructions, when executed by the electronic processor, are configured to cause the system to:
generate the library of answerable requests based on transaction data received from the plurality of custodians of transaction data.

16. The system of claim 1, further comprising a natural-language interpretation engine that is configured to interpret the request received via the microphone.

* * * * *